US010642069B2

(12) United States Patent
Jonin

(10) Patent No.: US 10,642,069 B2
(45) Date of Patent: May 5, 2020

(54) PRODUCTION METHOD OF UNHYDRATED OPHTHALMIC LENS AND UNHYDRATED OPHTHALMIC LENS

(71) Applicant: SEED CO., LTD., Tokyo (JP)

(72) Inventor: Kunio Jonin, Tokyo (JP)

(73) Assignee: SEED CO., LTD., Tokyo (JP)

(*) Notice: Subject to any disclaimer, the term of this patent is extended or adjusted under 35 U.S.C. 154(b) by 134 days.

(21) Appl. No.: 15/764,812

(22) PCT Filed: Oct. 6, 2016

(86) PCT No.: PCT/JP2016/079810
§ 371 (c)(1),
(2) Date: Mar. 29, 2018

(87) PCT Pub. No.: WO2017/061550
PCT Pub. Date: Apr. 13, 2017

(65) Prior Publication Data
US 2018/0275426 A1 Sep. 27, 2018

(30) Foreign Application Priority Data
Oct. 7, 2015 (JP) ................................. 2015-199391

(51) Int. Cl.
G02C 7/04 (2006.01)
C08F 14/16 (2006.01)
(Continued)

(52) U.S. Cl.
CPC .............. *G02C 7/049* (2013.01); *G02B 1/043* (2013.01); *G02C 7/04* (2013.01); *G02C 7/024* (2013.01)

(58) Field of Classification Search
None
See application file for complete search history.

(56) References Cited

U.S. PATENT DOCUMENTS 5,945,491 A * 8/1999 Matyjaszewski ......... C08F 2/38
525/135
9,346,971 B2 * 5/2016 Atanasova ............ A61L 31/048
(Continued)

FOREIGN PATENT DOCUMENTS

JP 1-133022 A 5/1989
JP 2001-108949 A 4/2001
(Continued)

OTHER PUBLICATIONS

Written Opinion dated Mar. 15, 2019, in Singapore Patent Application No. 11201802066W.
(Continued)

*Primary Examiner* — Tae H Yoon
(74) *Attorney, Agent, or Firm* — Birch, Stewart, Kolasch & Birch, LLP

(57) ABSTRACT

The purpose of the present invention is to provide a method for producing an unhydrated ophthalmic lens in which the lens surface has been made hydrophilic by imparting, using a simple technique, desired water wettability and stability against the surrounding environment to the lens surface of an unhydrated ophthalmic lens comprising a silicone compound as its constituent. This purpose can be achieved by a method for producing an unhydrated ophthalmic lens having on its lens surface a hydrophilic polymer having an alkyl halide at terminal, comprising the step of bringing an unhydrated ophthalmic lens having an alkyl halide into contact with a first aqueous solution containing a first hydrophilic monomer and a metal complex to obtain the unhydrated ophthalmic lens having on its lens surface a hydrophilic polymer having an alkyl halide at terminal.

11 Claims, 7 Drawing Sheets

IR change relative to immersion time in ATRP reaction mixture B

(51) Int. Cl.
   *G02B 1/04* (2006.01)
   *C08L 33/16* (2006.01)
   *G02C 7/02* (2006.01)

(56) References Cited

U.S. PATENT DOCUMENTS

| | | | |
|---|---|---|---|
| 9,526,813 B2* | 12/2016 | Cohn | A61L 31/06 |
| 2008/0179770 A1* | 7/2008 | Rooney | B29C 33/10 |
| | | | 264/1.36 |
| 2009/0171024 A1 | 7/2009 | Jakubowski et al. | |
| 2010/0072642 A1 | 3/2010 | Broad et al. | |
| 2011/0124819 A1* | 5/2011 | Hoelzl | C08F 293/005 |
| | | | 525/275 |

FOREIGN PATENT DOCUMENTS

| | | |
|---|---|---|
| JP | 2009-46529 A | 3/2009 |
| JP | 2011-508059 A | 3/2011 |
| JP | 2011-518907 A | 6/2011 |
| JP | 2013-57932 A | 3/2013 |
| JP | 2013-241541 A | 12/2013 |
| WO | WO 2009/085755 A1 | 7/2009 |
| WO | WO 2009/130233 A1 | 10/2009 |
| WO | WO 2015/133507 A1 | 9/2015 |

OTHER PUBLICATIONS

International Search Report for PCT/JP2016/079810 (PCT/ISA/210) dated Dec. 20, 2016.
Written Opinion of the International Searching Authority for PCT/JP2016/079810 (PCT/ISA/237) dated Dec. 20, 2016.
International Preliminary Report on Patentability and Written Opinion dated Apr. 19, 2018, in PCT International Application No. PCT/JP2016/079810, with English translation.
English translation of Office Action dated Mar. 26, 2019, in Chinese Paten Application No. 201680057804.2.
Extended European Search Report dated Apr. 26, 2019, in European Patent Application No. 16853702.5.
Chinese Office Action, dated Dec. 3, 2019 for Chinese Application No. 201680057804.2, with an English translation.

* cited by examiner

[FIG.1A]
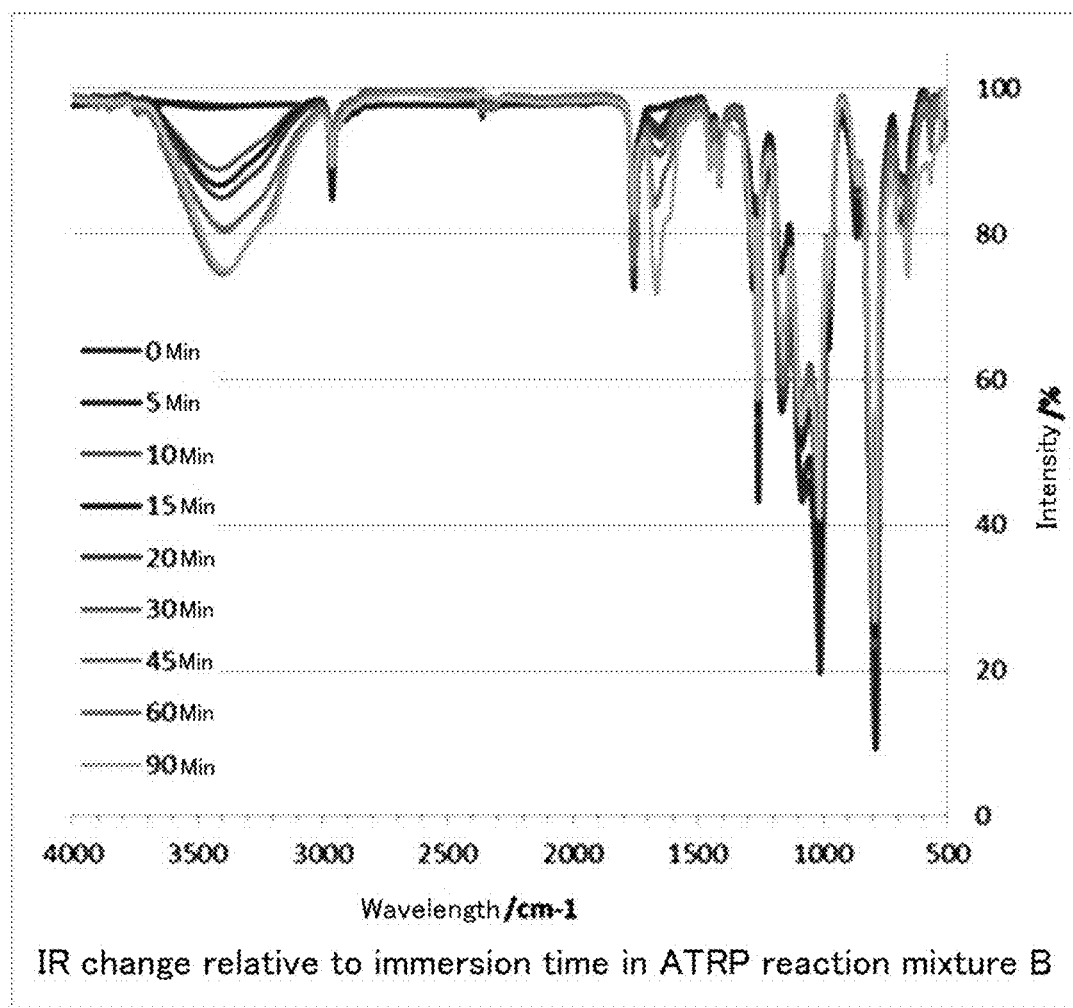
IR change relative to immersion time in ATRP reaction mixture B

[FIG.1B]
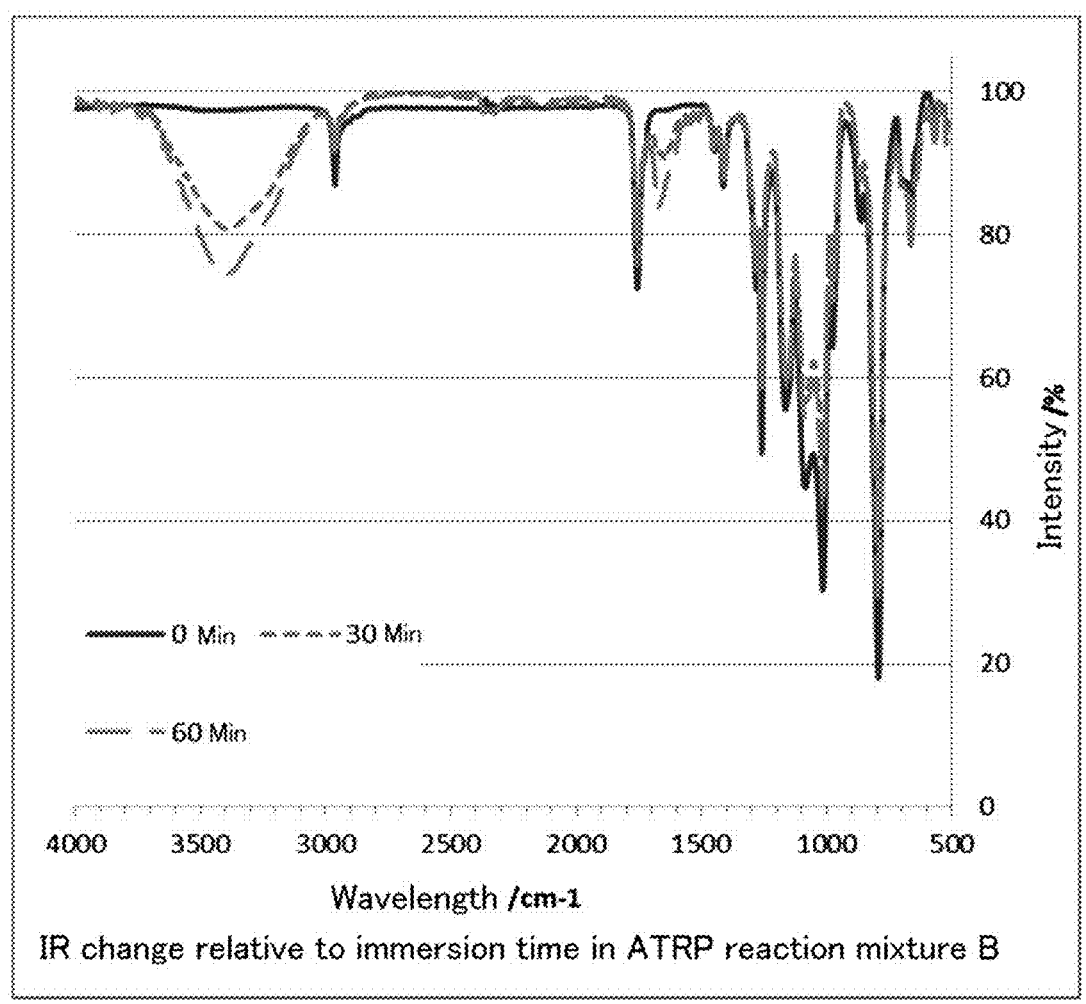
IR change relative to immersion time in ATRP reaction mixture B

[FIG. 2A]
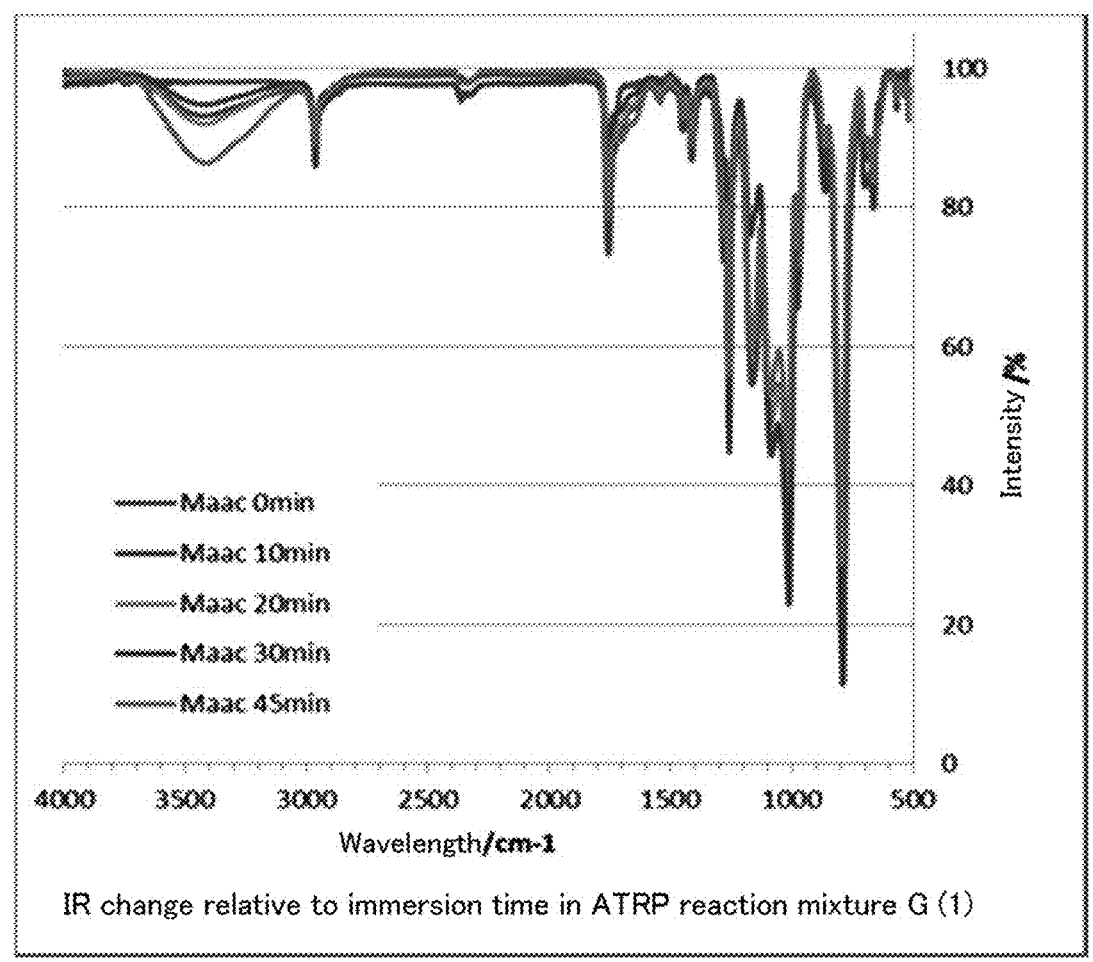
IR change relative to immersion time in ATRP reaction mixture G (1)

[FIG.2B]
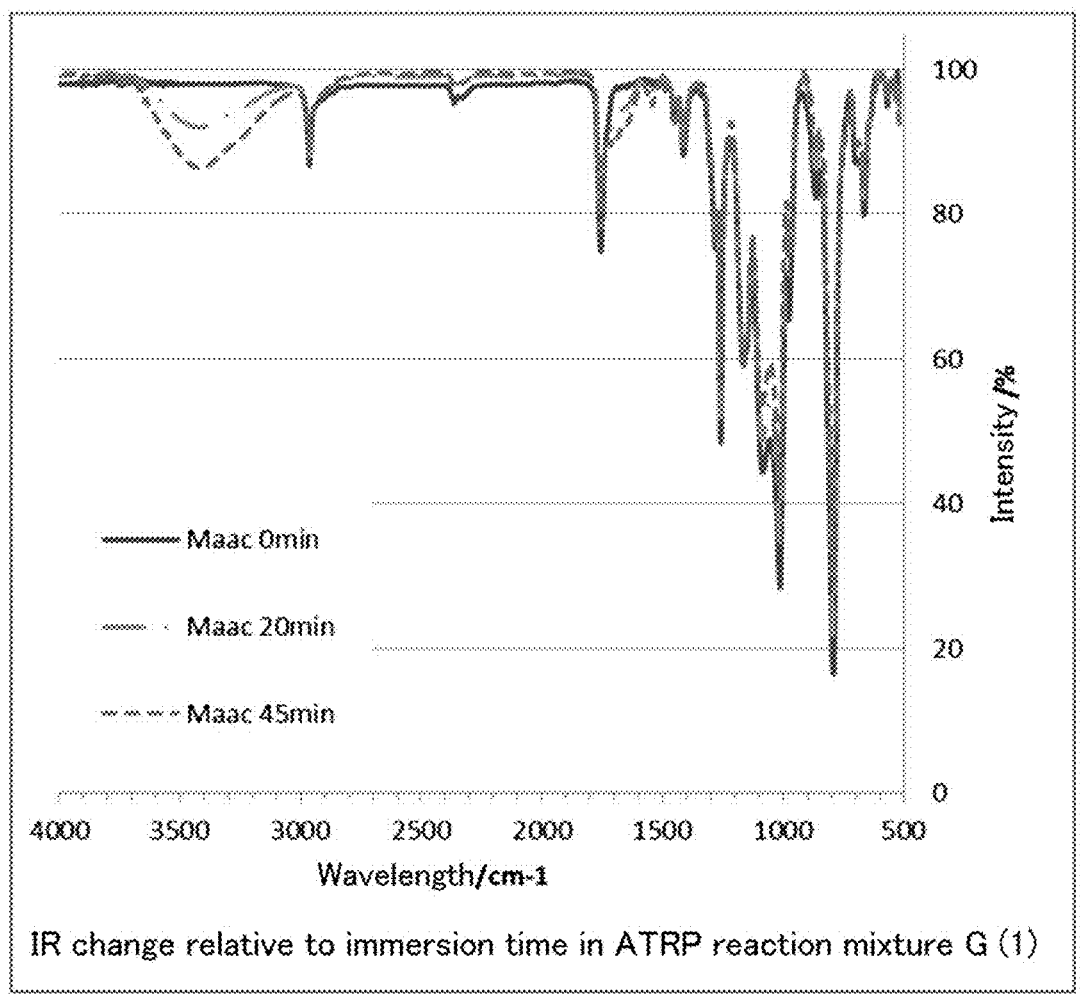

[FIG.3]
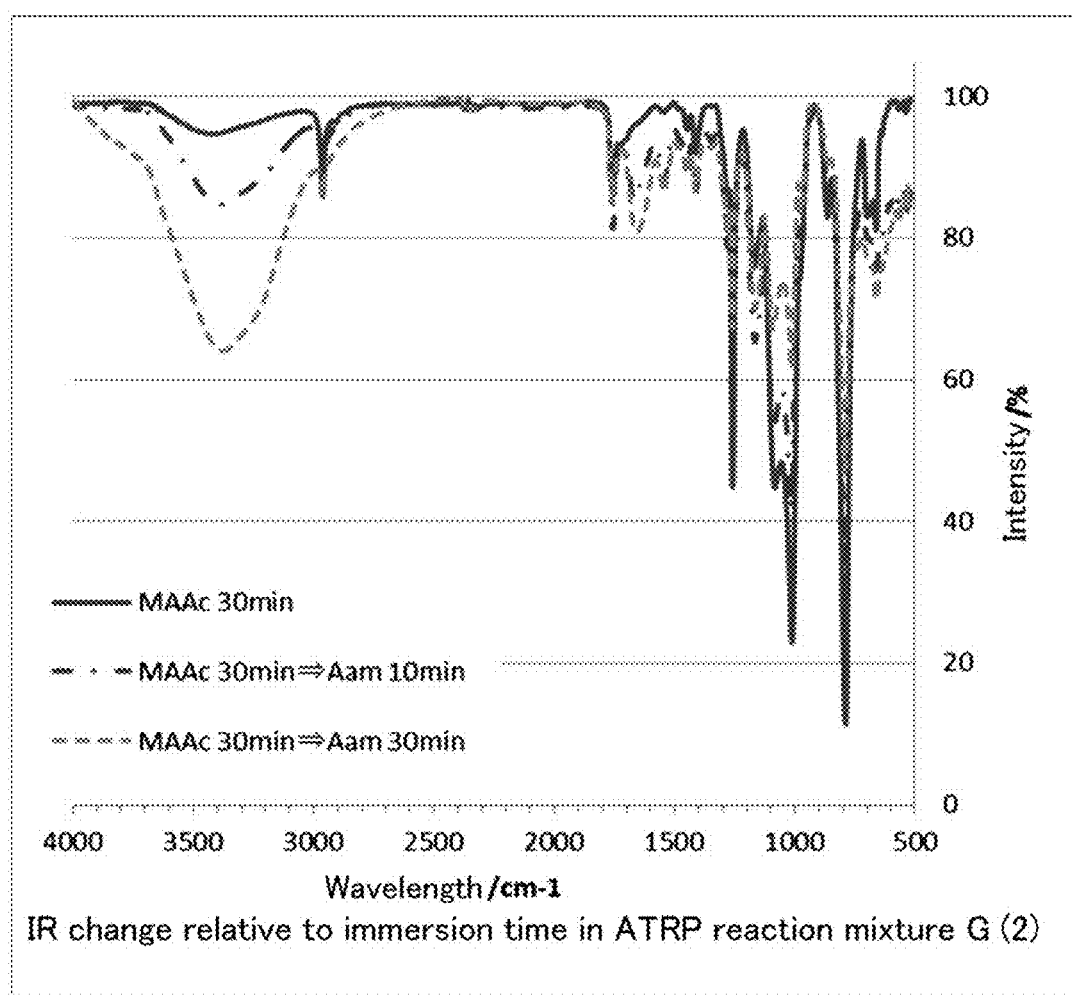

[FIG.4]
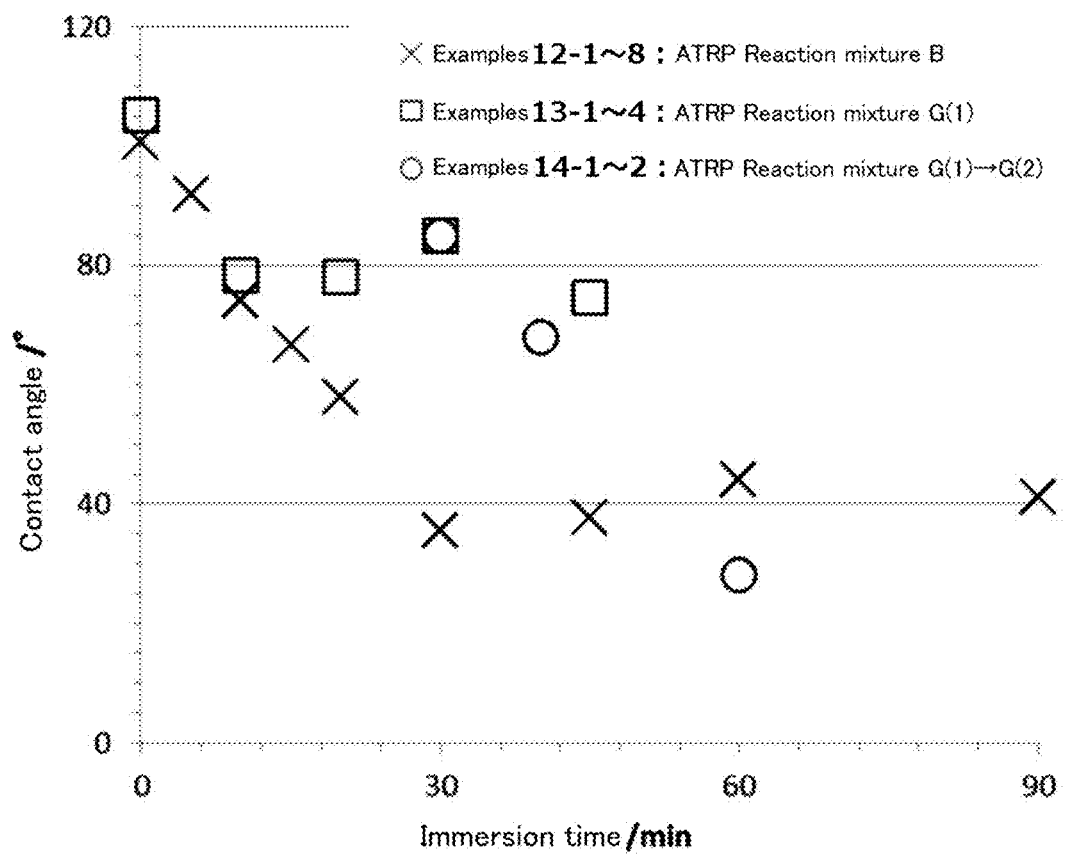
Changes in contact angle relative to immersion time in ATRP reaction mixtures

[FIG.5]
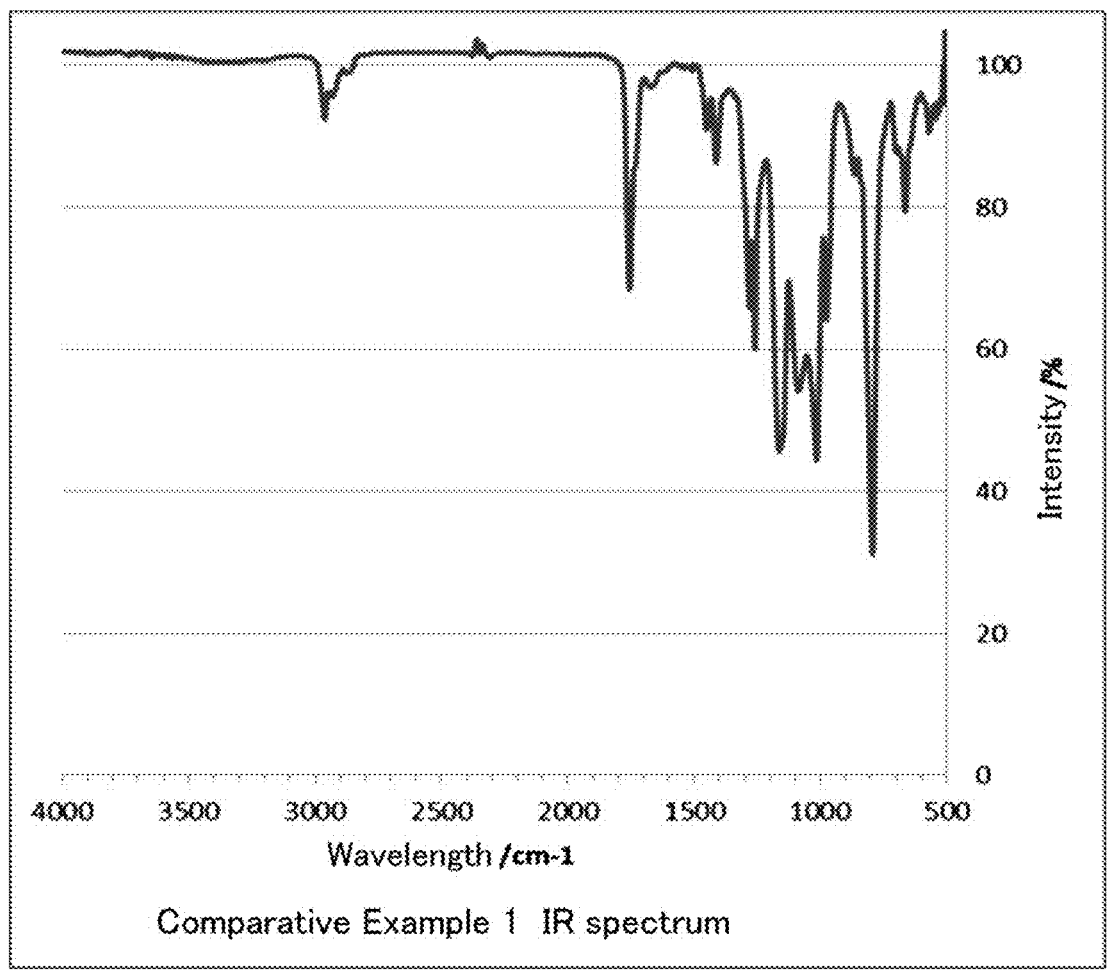
Comparative Example 1 IR spectrum

PRODUCTION METHOD OF UNHYDRATED OPHTHALMIC LENS AND UNHYDRATED OPHTHALMIC LENS

CROSS-REFERENCE TO RELATED APPLICATION

The present application claims the benefit of priority to Japanese Patent Application No. JP-A-2015-199391 filed Oct. 7, 2015, the disclosure of which is incorporated herein by reference in its entirety.

TECHNICAL FIELD

The present invention relates to a method for producing an unhydrated ophthalmic lens having a hydrophilic lens surface, as well as to an unhydrated ophthalmic lens having a hydrophilic lens surface obtained by such a method.

BACKGROUND ART

The eye is an organ in which transparency should be maintained. An eye is supplied with oxygen to keep the eye healthy. However, the absence of blood vessels in the eye tissue requires that oxygen be supplied to the eye cells directly from the atmosphere through the cornea, rather than through the blood.

When worn on the eye, contact lenses significantly impede the oxygen supply to the cornea. In particular, extended wear of contact lenses can result in oxygen depletion in the cornea, causing eye diseases such as redness, corneal edema and vascular invasion. For this reason, the oxygen permeability is particularly important among other properties of contact lenses as it affects the oxygen supply to the eye cells.

Hard contact lenses (RGPs) and unhydrated soft contact lenses have high oxygen permeability due to their silicone component. Nonetheless, the high lipophilicity and water-repellency of the silicone component tend to make these contact lenses less lubricious and susceptible to adhesion of lipids and proteins. In this respect, the adhesion of lipids and proteins to contact lenses can cause problems such as foreign body sensation and low visibility. To address these issues, various surface modification techniques have been proposed in order to prevent the adhesion of lipids and proteins and improve the surface wettability in contact lenses comprising a silicone component.

For example, Patent Document 1 listed below (the entire disclosure of which is incorporated herein by reference) discloses a method for modifying a surface of an ophthalmic lens with a graft polymer by subjecting an ophthalmic lens substrate to a plasma treatment to generate radicals on the treated surface of the ophthalmic lens, and subsequently immersing the ophthalmic lens in a monomer solution for polymerization.

Patent Document 2 listed below (the entire disclosure of which is incorporated herein by reference) discloses a method for making a surface of a soft resin device hydrophilic by alternately laminating the surface of the device with an acidic polymer and a basic polymer.

Patent Document 3 listed below (the entire disclosure of which is incorporated herein by reference) discloses a method for modifying a surface of an ophthalmic lens by preparing in advance a polymer surface modifying agent having any desired terminal functional group by using the atom transfer radical polymerization (ATRP) technique or the reversible addition-fragmentation chain transfer (RAFT) polymerization technique, and then allowing the surface modifying agent to covalently bond with a functional group on the surface of the ophthalmic lens to immobilize the surface modifying agent onto the lens surface.

CITATION LIST

Patent Document

Patent Document 1: JP-A-2001-108949
Patent Document 2: JP-A-2013-57932
Patent Document 3: JP-T-2011-508059

SUMMARY OF INVENTION

Technical Problem

Various problems are associated with each of the above-described methods of Patent Documents 1 to 3. For example, in the method of Patent Document 1, the plasma treatment performed on the ophthalmic lens can alter the ophthalmic lens substrate, causing yellow discoloration. Also, the radicals generated by the plasma treatment readily lose their activities, which makes it difficult to modify the lens surface with polymers other than homopolymers consisting of a single component or random copolymers consisting of certain proportions of components. As a result, the variety of the lens surface modification tends to be limited.

In the method of Patent Document 2, the laminated film tends to have an unstable film structure and sufficient surface modification effect may not be achieved if the laminated film does not include three or more layers. The resulting laminated film, which is formed by alternately laminating an acidic polymer and a basic polymer, readily decomposes as the charges of the polymers are neutralized under the influence of surrounding environments, such as pH and salt intensity. As a result, the ophthalmic lenses obtained by the method of Patent Document 2 tend to have an unstable film structure depending on the care products used to store or rinse the lenses.

The method of Patent Document 3 requires in-advance preparation of polymers to serve as the surface modifying agents, including purification and separation of the polymers. This makes the surface modification process undesirably complicated. In addition, the process is so-called a "grafting-to" process in which a polymer chain is bound to the lens substrate. Thus, in the method of Patent Document 3, the bulkiness of the surface modifying agent itself tends to inhibit the reaction between the lens surface and the surface modifying agent. This makes it difficult to form a graft polymer that provides sufficient water wettability on the lens surface.

As described above, the methods of Patent Documents 1 to 3 have disadvantages that the ophthalmic lens substrate is susceptible to damage caused by the surface modification process of the ophthalmic lens substrate; the methods offer a poor variety of surface modification processes; the surface modification process may not achieve sufficient surface hydrophilicity; the surface-modified regions are fragile; and that the surface modification process is complicated. Thus, while these methods may each be used to obtain unhydrated ophthalmic lenses with desirable lens surface hydrophilicity, they are of less utility and only provide insufficient industrial productivity.

In view of the above-described problems, it is an objective of the present invention to provide a method for producing an unhydrated ophthalmic lens in which the lens surface has been made hydrophilic by imparting, using a simple technique, desired water wettability and stability against the surrounding environment to the lens surface of an unhydrated ophthalmic lens comprising a silicone compound as its constituent.

Solution to Problem

In the course of extensive study to find a solution to the above-described problems, the present inventors have focused on the surface graft polymerization based on the atom transfer radical polymerization (ATRP). ATRP is a type of radical polymerization in which an active species having a propagating radical (for example, a functional group with a terminal radical) and a dormant species capped with a halogen atom (for example, a functional group with a terminal halogen) are in an equilibrium that is largely shifted in favor of the dormant species, such that the number of the active species is limited to such a degree as to facilitate the propagation reaction with monomers to allow the active species to elongate while the termination reaction is suppressed.

In normal radical polymerization, radicals of active species may undergo not only the propagation reaction, but also termination reactions, including recombination, in which two radicals combine, disproportionation, in which radicals form a bond within a molecule, and chain transfer, in which radicals are transferred to solvent or other molecules. One condition that causes such termination reactions is an increase in the number of (radicals of) active species. It is difficult to control the molecular weight of the resulting polymers under the termination reaction condition and the polymers tend to have a broad molecular weight distribution. Further, the terminal structures of the resulting polymers can vary depending on the termination reaction and are difficult to control.

In ATRP, polymers with a narrow molecular weight distribution can be obtained since the equilibrium between the active and dormant species is largely shifted to the dormant species so that the termination reactions are suppressed. Also, because the terminals of the polymers obtained by ATRP are dormant species, polymers that have stopped propagation can resume propagation when the reaction conditions are met again. Because of this characteristic, block copolymers can be obtained in a relatively easy fashion by collecting polymers obtained after polymerization of a first monomer and subsequently polymerizing a second monomer.

The present inventors have considered that a variety of hydrophilic surfaces can be formed to suit intended purposes by utilizing so-called a "grafting-from" process in which an alkyl halide group-containing component to serve as a dormant initiator for ATRP is introduced into an ophthalmic lens substrate, which in turn is brought into contact with a hydrophilic monomer and a metal complex to allow the hydrophilic monomer to polymerize from the surface of the ophthalmic lens substrate. In this manner, sufficient water wettability and antifouling property may be imparted to the ophthalmic lens surface without causing steric hindrance that interferes with the reaction between the ophthalmic lens surface and the hydrophilic monomer. Furthermore, the process enables introduction of block copolymers, which would be difficult by using the conventional graft polymerization process.

Based on this idea, the present inventors have successfully produced an unhydrated ophthalmic lens having a hydrophilic polymer on its lens surface by using an unhydrated ophthalmic lens substrate as the ophthalmic lens substrate and water as the reaction solvent for graft polymerization, such that the hydrophilic monomer does not penetrate into the ophthalmic lens substrate and the propagation by ATRP occurs only on the surface of the ophthalmic lens substrate. The present inventors have also successfully produced an unhydrated ophthalmic lens having a block copolymer or a random copolymer with varying compositions by immersing the ophthalmic lens substrate in an aqueous solution containing two or more different hydrophilic monomers to successively polymerize the respective hydrophilic monomers. These successful examples have ultimately led to the completion of the present invention.

Accordingly, one embodiment of the present invention provides a method for producing an unhydrated ophthalmic lens having on its lens surface a hydrophilic polymer which is halogenated at the terminal, the method comprising the step of bringing an unhydrated ophthalmic lens having an alkyl halide group into contact with an aqueous solution containing a hydrophilic monomer and a metal complex to obtain the unhydrated ophthalmic lens having on its lens surface a hydrophilic polymer which is halogenated at the terminal.

In one embodiment of the production method of the present invention, the hydrophilic polymer is preferably a hydrophilic homopolymer, a hydrophilic block copolymer or a hydrophilic random copolymer.

In one embodiment of the production method of the present invention, the unhydrated ophthalmic lens having an alkyl halide group is preferably an unhydrated ophthalmic lens comprising an alkyl halide monomer and a hydrophobic monomer.

In one embodiment of the production method of the present invention, the alkyl halide monomer is preferably an alkyl halide monomer comprising a 2-haloisobutyl group and a polymerizable functional group.

In one embodiment of the production method of the present invention, the alkyl halide monomer is preferably 2-(2-bromoisobutyloxy)ethyl(meth)acrylate.

In one embodiment of the production method of the present invention, the metal complex is preferably a metal complex consisting of a copper ion and a ligand.

In one embodiment of the production method of the present invention, the aqueous solution preferably further contains a reducing agent.

In one embodiment of the production method of the present invention, the reducing agent is preferably at least one reducing agent selected from the group consisting of di(ethylhexane)tin, L-ascorbic acid, sodium L-ascorbate, glucose, and hydrazine.

Another embodiment of the present invention provides a method for producing an unhydrated ophthalmic lens having on its lens surface a hydrophilic random copolymer which is halogenated at the terminal, the method comprising the step of bringing an unhydrated ophthalmic lens having an alkyl halide group into contact with an aqueous solution containing two or more hydrophilic monomers and a metal complex to obtain the unhydrated ophthalmic lens having on its lens surface a hydrophilic random copolymer which is halogenated at the terminal.

Another embodiment of the present invention provides a method for producing an unhydrated ophthalmic lens having on its lens surface a hydrophilic block copolymer which is halogenated at the terminal, the method comprising the steps of bringing an unhydrated ophthalmic lens having an alkyl halide group with a first aqueous solution containing a first hydrophilic monomer and a metal complex to obtain an unhydrated ophthalmic lens having on its lens surface a first hydrophilic polymer which is halogenated at the terminal; and bringing the unhydrated ophthalmic lens having on its lens surface a first hydrophilic polymer which is halogenated at the terminal with a second aqueous solution containing a second hydrophilic monomer and a metal complex to obtain an unhydrated ophthalmic lens having on its lens surface a hydrophilic block copolymer composed of a second hydrophilic polymer which is halogenated at the terminal and the first hydrophilic polymer.

Another embodiment of the present invention provides an unhydrated ophthalmic lens that has on its lens surface a hydrophilic polymer which is halogenated at the terminal and has a contact angle of less than 90°.

In one embodiment of the unhydrated ophthalmic lens of the present invention, the hydrophilic polymer is preferably a hydrophilic homopolymer, a hydrophilic block copolymer or a hydrophilic random copolymer.

In one embodiment of the present invention, the unhydrated ophthalmic lens comprises a copolymer of an alkyl halide monomer and a hydrophobic monomer.

Advantageous Effects of Invention

According to one embodiment of the production method of the present invention, the modification of a lens surface can be achieved by ATRP so that surface-modified ophthalmic lenses can be provided with reduced physical damage to the ophthalmic lens substrate and decreased adverse effects on the optical characteristics as compared to the methods requiring a mechanical process such as plasma irradiation to form radicals to serve as the initiator of the graft polymerization.

According to one embodiment of the production method of the present invention, since the polymer formed on the surface of the ophthalmic lens is chemically bound to the lens surface, the polymer is stable regardless of pH, salt concentration and other surrounding environments and can thus provide the surface of ophthalmic lenses with semi-permanent water wettability.

Since the production method as one embodiment of the present invention can be achieved as a simple process in which ophthalmic lens substrates are immersed in an aqueous solution under normal temperature condition, the method can eliminate complex process control and is expected to enable economically advantageous production of ophthalmic lenses. This makes the method suitable for the production of disposable ophthalmic lenses, which usually requires large-scale production.

The hydrophilic polymer formed on the lens surface of either the ophthalmic lens obtained by one embodiment of the production method of the present invention or the ophthalmic lens of one embodiment of the present invention may not be limited to a homopolymer, but may also be a block copolymer or a random copolymer. Thus, the polymer may vary widely depending on the type of the hydrophilic monomer used. The formation of such hydrophilic polymers on the lens surface can help keep the lens surface clean and minimize adhesion of lipids and proteins to the lens surface, as well as increase in friction, during prolonged wearing. As a result, ophthalmic lenses can be provided in which the associated deterioration of wearing comfort and occurrence of eye damage are significantly reduced.

BRIEF DESCRIPTION OF DRAWINGS

FIG. 1A is a diagram showing changes in the infrared spectrometry relative to the immersion time in ATRP reaction mixtures for Examples 12-1 to 8 as described in Examples. "0 min" corresponds to Reference Example 1.

FIG. 1B is a diagram showing changes in the infrared spectrometry relative to the immersion time in ATRP reaction mixtures for Examples 12-5 (30 min) and Example 12-7 (60 min) as described in Examples. "0 min" corresponds to Reference Example 1.

FIG. 2A is a diagram showing changes in the infrared spectrometry relative to the immersion time in ATRP reaction mixtures for Examples 13-1 to 4 as described in Examples. "0 min" corresponds to Reference Example 1.

FIG. 2B is a diagram showing changes in the infrared spectrometry relative to the immersion time in ATRP reaction mixtures for Examples 13-2 (20 min) and Example 13-4 (45 min) as described in Examples. "0 min" corresponds to Reference Example 1.

FIG. 3 is a diagram showing changes in the infrared spectrometry relative to the immersion time in ATRP reaction mixtures for Examples 14-1 to 2 as described in Examples. "MAAc 30 min" corresponds to Example 13-3.

FIG. 4 is a diagram showing changes in water contact angle relative to the immersion time in ATRP reaction mixtures as described in Examples.

FIG. 5 is a diagram showing the results of infrared spectrometry for Comparative Example 1 as described in Examples.

DESCRIPTION OF EMBODIMENTS

The present invention will now be described in details.

A first embodiment of the present invention is a method for producing an unhydrated ophthalmic lens having on its lens surface a hydrophilic polymer which is halogenated at the terminal. The production method as one embodiment of the present invention includes at least the step of bringing an unhydrated ophthalmic lens having an alkyl halide group into contact with an aqueous solution containing a hydrophilic monomer and a metal complex to obtain an unhydrated ophthalmic lens having on its lens surface a hydrophilic polymer having a terminal halogen. As used herein, the term "alkyl halide group" is not particularly limited and refers to any functional group in which at least a portion of an alkyl group is halogenated. For example, it can be represented by the structural formulas such as X—R—, $X_2$—R—, X—R—CO—, and X—R—CO—O— (wherein R represents a substituted or unsubstituted alkylene group).

In one embodiment of the production method of the present invention, an unhydrated ophthalmic lens having on its lens surface a hydrophilic polymer which is halogenated at the terminal is obtained by allowing a hydrophilic polymer which is halogenated at the terminal to directly covalently bind to the lens surface based on surface graft polymerization by ATRP. The hydrophilic surface on which the hydrophilic polymer having a terminal halogen has been formed is stable regardless of pH, salt concentration and other surrounding environments and can maintain semi-permanent water wettability. Furthermore, since the hydrophilic polymer may be any block copolymer or random copolymer formed of two or more hydrophilic monomers, aside from being a hydrophilic homopolymer formed of a single hydrophilic monomer, the unhydrated ophthalmic lens obtained by one embodiment of the production method of the present invention in which the lens surface has been made hydrophilic can be produced such that it has a surface design that suits intended purposes.

While the technical scope of the present invention is not bound by any speculation or presumption, the surface graft polymerization by ATRP proceeds according to the following Scheme 1:

[Scheme 1]

(Chemical formula 1)

 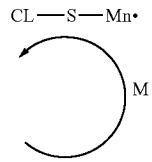

(wherein CL represents an ophthalmic lens substrate; S represents —O—CO—R— (wherein R represents a substituted or unsubstituted alkylene group having two to four carbon atoms); X represents a halogen; Mt represents a metal ion; Z represents an integer of 1 to 3; L represents a ligand; M represents a monomer; and n represents an integer of 2 or more).

According to Scheme 1, when the ophthalmic lens substrate having an alkyl halide group (—S—X, or —O—CO—R—X) comes into contact with the metal complex consisting of a metal ion and a ligand, halogen (X) is abstracted to form a propagating radical (—O—CO—R.), which is an active species. As the propagating radial reacts with the monomers (M), the graft polymerization onto the ophthalmic lens substrate proceeds. This produces an ophthalmic lens having a polymer (CL-O—CO—R—Mn.).

If the monomer is a hydrophilic monomer, the formation of hydrophilic polymer on the ophthalmic lens substrate by graft polymerization makes the lens surface hydrophilic. When a silicone component is present as a component of the ophthalmic lens, however, the poor compatibility between the silicone component and the hydrophilic polymer causes clouding and deformation due to phase separation if the two components are present within the lens.

To address this problem, one embodiment of the production method of the present invention employs, as the ophthalmic lens substrate, an unhydrated ophthalmic lens substrate formed of a polymer of monomer components including an alkyl halide monomer, a silicone monomer and a hydrophobic monomer. The unhydrated ophthalmic lens substrate can then be immersed in an aqueous solution containing a metal complex and the hydrophilic monomer to bring the two components into contact with each other (which may be referred to as ATRP reaction, hereinafter). In this manner, the metal complex and the hydrophilic monomer can be delivered to the surface of the lens substrate while minimizing the penetration of the aqueous solution into the lens substrate. As a result, ATRP proceeds predominantly at the surface of the lens substrate. This enables production of an unhydrated ophthalmic lens having a halogenated hydrophilic polymer on its lens surface.

According to one embodiment of the production method of the present invention, the phase separation between the ophthalmic lens substrate and the hydrophilic polymer formed can be reduced and hydrophilization, a type of surface modification, can be achieved without causing alteration of the ophthalmic lens substrate.

As described below, the type of hydrophilic monomer; the type of aqueous solution containing a hydrophilic monomer and a metal complex; and the number of times of ATRP reaction are not particularly limited in one embodiment of the production method of the present invention, so that the resulting hydrophilic polymer may be a hydrophilic polymer comprising a hydrophilic homopolymer, a hydrophilic block copolymer, a hydrophilic random copolymer, and a combination thereof. For example, an unhydrated ophthalmic lens in which a first hydrophilic monomer has been graft-polymerized onto its lens surface can be immersed in an aqueous solution containing a second hydrophilic monomer different from the first hydrophilic monomer and a metal complex to form an additional graft polymer chain of the second hydrophilic monomer that extends from the graft polymer chain of the first hydrophilic monomer. This enables production of an unhydrated ophthalmic lens having on its lens surface a hydrophilic block copolymer consisting of two graft polymer chains. As described above, since the type of the hydrophilic monomer to be used and the number of times of the graft polymerization reaction are not particularly limited, graft copolymers comprising multiple different building blocks can be obtained by the selection of hydrophilic monomer and a wide variety of lens surface design can thus be achieved to suit intended purposes.

By using terms used in Scheme 1, the step in one embodiment of the production method of the present invention can be expressed as follows:

the step of bringing an unhydrated ophthalmic lens (CL-O—CO—R—X) having an alkyl halide group (—O—CO—R—X) into contact with an aqueous solution containing a hydrophilic monomer (M) and a metal complex (Mt$^z$/L) to obtain an unhydrated ophthalmic lens having on its lens surface a hydrophilic polymer which is halogenated at the terminal (CL-O—CO—R—Mn—X).

In the above-described step, an unhydrated ophthalmic lens having an alkyl halide group is used as the ophthalmic lens substrate. While the method to prepare the unhydrated ophthalmic lens having an alkyl halide is not particularly limited, such an ophthalmic lens can be obtained, for example, by preparing a solution containing at least monomer components such as a silicone monomer, a hydrophobic monomer and a polymerizable alkyl halide agent (alkyl halide monomer) to serve as constituents, optionally adding a polymerization initiator such as bis(2,4,6-trimethylbenzoyl)-phenylphosphine oxide and azobisisobutyronitrile, and subjecting the solution to heat or light depending on the presence or absence or the type of the polymerization initiator to conduct polymerization and curing. The term "monomer" as used herein is used in contrast to the term "polymer" and means a molecule having a polymerizable functional group such as —C=C— group, whereas the term "polymer" means a macromolecule composed of polymerized monomers, unless otherwise specified.

The silicone monomer is not particularly limited and may be any monomer that has repeating units of siloxane bonds and a polymerizable functional group. Specific examples of the silicone monomer include methacryloxypropyl bis(trimethylsiloxy)methylsilane, α,ω-dimethacryloxypropyl polydimethylsiloxane, α-methacryloxy-ω-butylpolydimethylsiloxane, methacryloxypropyl tris(trimethylsiloxy)silane (tristrimethylsiloxypropyl methacrylate). The silicone monomer can be formulated as a combination of one or two or more of the above-described specific examples to provide an ophthalmic lens with desired oxygen permeability.

The source and the amount of the silicone monomer are not particularly limited; for example, a commercially available product may be used in an amount of 25 to 65 wt %, preferably in an amount of 35 to 55 wt %, based on the total amount of the monomer components added as the constituents of the ophthalmic lens substrate.

The hydrophobic monomer is not particularly limited and may be any monomer that has a hydrophobic group, such as fluorine and a hydrocarbon, and a polymerizable functional group. Specific examples of the hydrophobic monomer include straight-chained, branched or cyclic alkyl(meth)acrylates, such as methyl(meth)acrylate, ethyl(meth)acrylate, propyl(meth)acrylate, i-propyl(meth)acrylate, n-butyl(meth)acrylate, i-butyl(meth)acrylate, t-butyl(meth)acrylate, pentyl(meth)acrylate, trimethylcyclohexyl(meth)acrylate, t-butylcyclohexyl(meth)acrylate, hexyl(meth)acrylate, 2-ethylhexyl(meth)acrylate, cyclohexyl(meth)acrylate, heptyl(meth)acrylate, octyl(meth)acrylate, nonyl(meth)acrylate, decyl(meth)acrylate, dodecyl(meth)acrylate, lauryl(meth)acrylate, tridecyl(meth)acrylate, tetradecyl(meth)acrylate, methoxy diethylene glycol(meth)acrylate, ethoxy diethylene glycol(meth)acrylate, ethylene glycol di(meth)acrylate, 3-methyltridecyl(meth)acrylate, 6-methyltridecyl(meth)acrylate, 7-methyltridecyl(meth)acrylate, 2,1,1-dimethyldodecyl(meth)acrylate, 2,7-dimethyl-4,5-diethyloctyl(meth)acrylate, pentadecyl(meth)acrylate, stearyl(meth)acrylate, i-stearyl(meth)acrylate, allyl(meth)acrylate, phenyl(meth)acrylate, phenoxyethyl(meth)acrylate, benzyl(meth)acrylate, and isobornyl(meth)acrylate; trifluoroethyl(meth)acrylate, tetrafluoropropyl(meth)acrylate, tetrafluoropentyl(meth)acrylate, hexafluorobutyl(meth)acrylate, hexafluorohexyl(meth)acrylate, hexafluoro bis(trifluoromethyl)pentyl(meth)acrylate, hexafluoro isopropyl(meth)acrylate, heptafluorobutyl(meth)acrylate, octafluoropentyl(meth)acrylate, nonafluoropentyl(meth)acrylate, dodecafluoroheptyl(meth)acrylate, dodecafluorooctyl(meth)acrylate, tridecafluorooctyl(meth)acrylate, tridecafluoroheptyl(meth)acrylate, hexadecafluorodecyl(meth)acrylate, heptadecafluorodecyl(meth)acrylate, octadecafluoro undecyl(meth)acrylate, nonadecafluoro undecyl(meth)acrylate, eicosafluorododecyl(meth)acrylate, 2-hydroxy-octafluoro-6-trifluoromethylheptyl(meth)acrylate, 2-hydroxy-dodecafluoro-8-trifluoromethyl nonyl(meth)acrylate, 2-hydroxyhexadecafluoro-10-trifluoromethyl undecyl(meth)acrylate, n-propyl vinyl ether, isopropyl vinyl ether, n-butyl vinyl ether, isobutyl vinyl ether, ethylhexyl vinyl ether, and cyclohexyl vinyl ether. The hydrophobic monomer can be formulated as a combination of one or two or more of the above-described specific examples to provide an ophthalmic lens with desired physical property. When the hydrophobic monomer is a monomer with a low glass transition temperature, a rigid unhydrated ophthalmic lens (so-called hard contact lens) can be obtained, whereas a soft unhydrated ophthalmic lens can be obtained when a monomer with a high grass transition temperature is used.

The source and the amount of the hydrophobic monomer are not particularly limited; for example, a commercially available product may be used in an amount of 30 to 70 wt %, preferably in an amount of 40 to 60 wt %, based on the total amount of the monomer components added as the constituents of the ophthalmic lens substrate. The ratio of the silicone monomer and the hydrophobic monomer is not particularly limited; for example, the ratio of hydrophobic monomer:silicone monomer is from 70 to 30:29 to 69, preferably from 60 to 50:39 to 49.

By using an alkyl halide monomer as a constituent of the unhydrated ophthalmic lens, dormant species to serve as the initiator of ATRP can be introduced to the lens surface. The alkyl halide monomer is not particularly limited and may be any compound having an alkyl halide group such as 2-haloisobutyryl group and a polymerizable functional group. For example, the alkyl halide monomer includes compounds represented by the following general formula (1):

(Chemical formula 2)

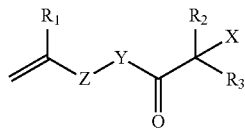

(1)

(wherein $R^1$, $R^2$ and $R^3$ each independently represent a hydrogen group or a methyl group; Z represents O, COO or CONH group; Y represents $(CH_2)nO$ (where n represents an integer); X represents a halogen group such as chlorine group and bromine group).

Non-limiting specific examples of the compound of the general formula (1) include 2-(2-bromoisobutyryloxy) ethyl methacrylate represented by the following general formula (2):

(Chemical formula 3)

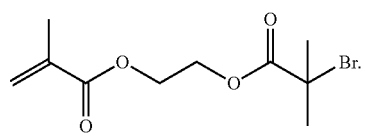

(2)

Other examples include, but are not limited to, 2-(2-bromoisobutyryloxy)ethyl acrylate, 2-(2-bromopropionyloxy) ethyl methacrylate, and 2-(2-bromopropionyloxy)ethyl acrylate. These compounds are commercially available or they may be prepared by reacting 2-hydroxyalkyl(meth)acrylate with an acid halide such as 2-bromoisobutyryl bromide and 2-bromopropionyl bromide according to the method described in Krzysztof Matyjaszewski et al., Macromolecules, 1997, 30, 5192-5194, the entire disclosure of which is incorporated herein by reference. Also, an acid halide such as 2-chloropropionyl chloride may be used as the acid halide in the above-described reaction to obtain a compound that has the backbone represented by the general formula (1) and a halogen atom other than bromine.

The amount of the alkyl halide monomer is not particularly limited; for example, the alkyl halide monomer is added in an amount of 0.01 to 10 wt %, preferably in an amount of 0.05 to 5 wt %, and more preferably in an amount of 0.1 to 3.0 wt % based on the total amount of the monomer components added as the constituents of the ophthalmic lens substrate while the amount may vary depending on the type of the alkyl halide monomer. It should be noted, however, that the alkyl halide monomer is generally a water-absorptive compound and the density of the graft polymer formed on the lens surface may vary depending on the amount of the alkyl halide monomer. For this reason, the ophthalmic lens substrate can exhibit water absorption when the alkyl halide monomer is added in an excess amount. If the ophthalmic lens substrate absorbs water, the hydrophilic monomers and metal complexes may be delivered to the alkyl halide group within the lens and the graft reaction may proceed. As a result, phase separation may occur between the ophthalmic lens and the graft polymer, causing clouding and deformation of the lens. Conversely, if the amount of the alkyl halide monomer is too small, the density of the graft polymer may become too small to sufficiently cover the hydrophobic surface of the ophthalmic lens and sufficient hydrophilicity may not be achieved.

In addition to the silicone monomer, the hydrophobic monomer and the alkyl halide monomer, other monomer components may be added as constituents of the unhydrated ophthalmic lens to serve as the ophthalmic lens substrate. For example, cross-linking agents and hydrophilic monomers as described below may also be added. When the other monomer components comprises a hydrophilic monomer, it is added in an amount of 10 wt % or less, preferably in an amount of 6 wt % or less based on the total amount of the monomer components added as the constituents of the ophthalmic lens substrate, while the amounts of such other monomer components are not particularly limited.

The unhydrated ophthalmic lens to serve as the ophthalmic lens substrate can be produced by any known method; for example, the unhydrated ophthalmic lens may be produced by molding or grinding. The resulting unhydrated ophthalmic lens may then be immersed in an organic solvent to remove any unreacted constituents. In this manner, an unhydrated ophthalmic lens having an alkyl halide group as the reaction initiation point is prepared.

While the aqueous solution containing a hydrophilic monomer and a metal complex for use in the above-described step may be prepared by any suitable method, the aqueous solution (which may be referred to as "ATRP reaction mixture," hereinafter) may be prepared, for example, by weighing the hydrophilic monomer, a metal salt, and a ligand, and dissolving them in a predetermined volume of pure water. The metal complex may be a prepared metal complex already composed of a metal ion and a ligand, or alternatively, a metal salt, metal ion, and a ligand may be separately added to form the metal complex.

The hydrophilic monomer is a monomer component to form the graft polymer. A metal ion and a ligand form a metal complex that acts to abstract a halogen atom from an alkyl halide in the unhydrated ophthalmic lens during the ATRP reaction.

If the metal ion is oxidized by oxygen supplied from the aqueous solution or the air interface during the ATRP reaction, the abstraction reaction of halogen atoms by the metal complex will not proceed and initiation radicals may not be generated. It is thus preferred that oxygen be removed from the ATRP reaction mixture. The technique to remove oxygen from the ATRP reaction mixture is not particularly limited and may include bubbling with an inert gas, degassing under reduced pressure, and addition of reducing agents. These techniques may be used either individually or in combination.

ATRP employing reducing agents is referred to as the ARGET ATRP process. In contrast to the classic ATRP process, which does not use reducing agents, the ARGET ATRP process can prevent inactivation of metal ions by oxidation and can thus allow a reduction of the amount of metal ions. This not only facilitates the removal of metal ions after the reaction, but also helps reduce coloration of the polymer caused by the metal ions.

The hydrophilic monomer for use in the ATRP reaction mixture is not particularly limited and may be any hydrophilic monomer that has one or more polymerizable functional groups such as (meth)acryl groups, (meth)acrylamide groups and vinyl groups in its molecule and has highly water solubility as a molecule. Specific examples of the hydrophilic monomer include acrylic acid, methacrylic acid, 2-dimethylaminomethyl acrylate, glycidyl(meth)acrylate, glycerin mono(meth)acrylate, 2-methacryloyloxyethyl phosphorylcholine, glycerin di(meth)acrylate, hydroxyethyl (meth)acrylate, polyethylene glycol mono(meth)acrylate, polypropylene glycol(meth)acrylate, diethylaminoethyl (meth)acrylate, acrylamide, methacrylamide, dimethylacrylamide, diethylacrylamide, hydroxyethyl acrylamide, dimethylaminopropyl acrylamide, N-isopropylacrylamide, N-vinylpyrrolidone, diacetoneacrylamide. These hydrophilic monomers may be used either alone or in combination of two or more. As described in Examples below, the hydrophilic monomer may be any of nonionic, anionic, cationic, and zwitterionic monomers.

The amount of the hydrophilic monomer used in the ATRP reaction mixture is not particularly limited; for example, it is preferably used in an amount of 1 to 10 wt % based on the solvent, or water, of the aqueous solution. If the amount of the hydrophilic monomer is excessive, the monomer may cause the unhydrated ophthalmic lens immersed in the ATRP reaction mixture to swell. As a result, the graft polymerization may proceed from the initiation points within the lens, thus causing clouding and deformation of the lens. If the amount of the hydrophilic monomer is too small, the graft polymerization is less likely to proceed so that the unhydrated ophthalmic lens after treatment may not have sufficient surface modification.

In addition to the hydrophilic monomer and the metal complex, other components may be added to the ATRP reaction mixture. For example, a crosslinking agent may be added to the ATRP reaction mixture to adjust the flexibility and wettability of the graft polymer.

The crosslinking agent is not particularly limited and may be any crosslinking agent that has two or more polymerizable functional groups such as (meth)acryl groups, (meth)acrylamide groups and vinyl groups in its molecule and has highly water solubility as a molecule. Specific examples of the crosslinking agent include N, N'-methylene bis-acrylamide, ethylene glycol di(meth)acrylate, polyethylene glycol di(meth)acrylate, trimethylolpropane tri(meth)acrylate, pentaerythritol tri(meth)acrylate, tripentaerythritol(meth) acrylate, (meth)acryl group-terminated dendrimer and tris (meth)acryloyloxyethyl phosphate. These crosslinking agents may be used either alone or in combination of two or more. The amount of the crosslinking agent is not particularly limited; for example, it is preferably added in an amount of 0 to 20 wt % based on the total mass of the hydrophilic monomer added to the aqueous solution. If the amount of the crosslinking agent exceeds 20 wt %, then the graft polymer tends to become too rigid and the resulting ophthalmic lens may cause a foreign body sensation to the wearer when the resulting ophthalmic lens is worn.

The metal complex added to the ATRP reaction mixture and the metal ion and the ligand that constitute the metal complex are not particularly limited; for example, a metal complex may be used that can abstract a halogen from an alkyl halide groups such as 2-haloisobutyl group to generate a radical, and that can establish an equilibrium with the dormant species so that the termination reaction of radicals is suppressed.

The metal ions added to the ATRP reaction mixture include, for example, ions of metal elements such as copper, titanium, iron, cobalt, nickel, molybdenum and ruthenium. Of these, copper ion is preferred in terms of reaction rate and cost. The metal ion is typically added in the form of a metal salt during preparation of the ATRP reaction mixture. The metal salt is not particularly limited; for example, when the metal ion is copper ion, the metal salt may include copper (I) chloride, copper (II) chloride, copper (I) bromide, copper (II) bromide, and copper (I) iodide.

In the ATRP reaction mixture, the metal ion binds to a ligand and forms a metal complex. Depending on the metal ion, the metal complex develops a significant color, causing coloration of the graft polymer. This may affect the appearance and light transmittance of the lens. The color development of the metal complex is approximately proportional to the concentration of the metal ions.

In the classical ATRP process, the absence of the reducing agent in the ATRP reaction mixture makes the metal complex susceptible to oxidation, so that a substantial amount of metal salt is required to facilitate the graft polymerization reaction. The amount of the metal ion used in the ATRP process is typically from 1,000 to 10,000 ppm. In contrast, the reducing agent added to the ATRP reaction mixture during the ARGET ATRP process allows a reduction of the amount of the metal salt. Accordingly, in one embodiment of the production method of the present invention, it is preferred to add a reducing agent to the ATRP reaction mixture. In this manner, the amount of the metal salt in the ATRP reaction mixture can preferably be made to 1,000 ppm or less. If the amount of the metal salt is too small, however, the radicals in the ATRP reaction mixture may not form dormant species and may be inactivated. As a result, the reaction may not proceed. Thus, the amount of the metal salt in the ATRP reaction mixture can be properly determined depending on the type of the metal salt or the amount of the hydrophilic monomer. For example, when the metal salt is a copper salt, the amount of the metal salt is from 10 to 2,000 ppm, preferably from 50 to 1,000 ppm, and more preferably from 50 to 500 ppm while the amount is not particularly limited.

The metal salt forms a metal complex with a coexisting certain ligand and abstracts a halogen from the alkyl halide to generate initiation radicals. The initiation radicals and the propagating radicals are in an equilibrium between the active species and the dormant species so that the termination reaction is significantly suppressed. While the ligand is not particularly limited, it can be appropriately selected depending, for example, on the type of the metal ion used in the formation of the complex. When copper ion is used as the metal ion, a nitrogen-containing ligand is useful for the formation of the complex. Since the binding constant with the metal ion varies depending of the ligand structure, the rate of initiation radical generation and the equilibrium constant between the dormant and the active species may also vary. As a result, the ratio between the active species and the dormant species and, thus, the rate of the graft polymerization may vary.

Specific examples of the ligand include 2,2'-dipyridyl, 4,4'-dimethyl-2,2'-dipyridyl, 4,4'-di-tert-butyl-2,2'-dipyridyl, 4,4'-dinonyl-2,2'-dipyridyl, N-butyl-2-pyridylmethanimine, N-octyl-2-pyridylmethanimine, N-dodecyl-N-(2-pyridyl-methylene)amine, N-octadecyl-N-(2-pyridyl-methylene)amine, N, N, N', N",N"-pentamethyldiethylenetriamine, tris (2-pyridylmethyl) amine, 1,1,4,7,10,10-hexamethyltriethylenetetramine, tris [2-(dimethylamino)ethyl]amine, 1,4,8,11-tetraazacyclotetra-decan, 1,4,8,11-tetramethyl-1,4,8,11-tetraazacyclotetradecane, and N, N, N', N'-tetrakis (2-pyridylmethyl)-ethylenediamine. These ligands may be used either individually or in combination of two or more.

While not particularly limited, the amount of the ligand is preferably from 1 to 10 times by mole the amount of the metal ion with which it forms a coordination complex. If the amount of the ligand is insufficient, the active species may not be formed in sufficient amounts to allow the reaction to proceed stably. As a result, the reaction may hardly proceed.

The method to prepare an ATRP reaction mixture containing at least a hydrophilic monomer and a metal complex consisting of a metal salt and a ligand is not particularly limited; for example, such a reaction mixture may be prepared by adding the hydrophilic monomer, the metal salt and the ligand to water, and mixing the mixture thoroughly to dissolve the components to form an aqueous solution, followed by bubbling with an inert gas or degassing under reduced pressure to remove undesirable oxygen from the aqueous solution. When the ARGET ATRP process is chosen, a reducing agent may be added to the ATRP reaction mixture along with the above-described components.

The reducing agent can prevent inactivation of the reaction system by acting on the metal ions oxidized by oxygen or radicals and reducing them to a valency at which propagation radicals and dormant species can form. Specific examples of the reducing agent include di(ethylhexane)tin, L-ascorbic acid, sodium L-ascorbate, glucose, and hydrazine. These reducing agents may be used either individually or in combination of two or more.

In preparing the ATRP reaction mixture, it is preferred to provide a step of removing dissolved oxygen from the ATRP reaction mixture in order to improve the reactivity of the graft polymerization and reduce the inactivation of the metal complex by oxidation. It should be noted that oxygen may re-dissolve into the ATRP reaction mixture while carrying out one embodiment of the production method of the present invention. Thus, considering the amount of re-dissolving oxygen, the amount of the reducing agent in the ATRP reaction mixture is preferably 0.01 wt % or more, and more preferably 0.1 wt % or more relative to the mass of water used in the aqueous solution. If the amount of the reducing agent is less than 0.01 wt %, then the oxidation of the metal ion may proceed due to the shortage of the reducing agent and the ATRP reaction may not occur.

In the above-described step, ATRP-based graft polymerization onto the lens surface of an unhydrated ophthalmic lens to serve as the ophthalmic lens substrate is carried out. This can be described using the terms in Scheme 1 as follows: the hydrophilic monomer and the metal complex in the ATRP reaction mixture are brought into contact with the lens surface of the unhydrated ophthalmic lens by immersing the unhydrated ophthalmic lens (CL-O—CO—R—X) in an aqueous solution to serve as the ATRP reaction mixture containing the hydrophilic monomer (M) and the metal complex ($Mt^z/L$). The method to bring the unhydrated ophthalmic lens having an alkyl halide group into contact with the aqueous solution containing a hydrophilic monomer and a metal complex is not particularly limited; it may be any method that can allow contact between the unhydrated ophthalmic lens and the aqueous solution to such a degree that an unhydrated ophthalmic lens having on its lens surface a hydrophilic polymer which is halogenated at the terminal can be obtained.

Since the ATRP reaction is a reversible process, the active species and the dormant species are repeatedly generated and hydrophilic polymers are formed as graft polymer chains when the active species are formed. Since the hydrophilic polymers obtained by the ATRP reaction are dormant species having halogenated termination ends, they can form propagating radicals when contacted by the metal complex again. Accordingly, the unhydrated ophthalmic lens having on its lens surface a hydrophilic polymer formed by the ATRP reaction can be subjected to a further ATRP reaction to grow new graft polymers from the halogenated termination ends of the originally formed hydrophilic polymers.

The number of times of the ATRP reaction is not particularly limited and may be appropriately determined according to the number of times of the contacts between the unhydrated ophthalmic lens and the ATRP reaction mixture. In one embodiment of the production method of the present invention, homopolymers, random copolymers, block copolymers, and copolymers having multiple different configurations may be formed on the lens surface of the unhydrated ophthalmic lens depending on the type of the hydrophilic monomer added to the ATRP reaction mixture and the number of times of the contacts between the unhydrated ophthalmic lens and the ATRP reaction mixture.

In a specific embodiment of one embodiment of the production method of the present invention, when it is desired to form homopolymers as the graft polymers to be formed on the surface of an ophthalmic lens, an unhydrated ophthalmic lens having an alkyl halide group is immersed once in an ATRP reaction mixture containing one hydrophilic monomer. This causes a polymerization reaction as shown in the following general formula (3) to proceed to give an unhydrated ophthalmic lens having on its lens surface a hydrophilic polymer which is halogenated at the terminal:

(Chemical formula 4)

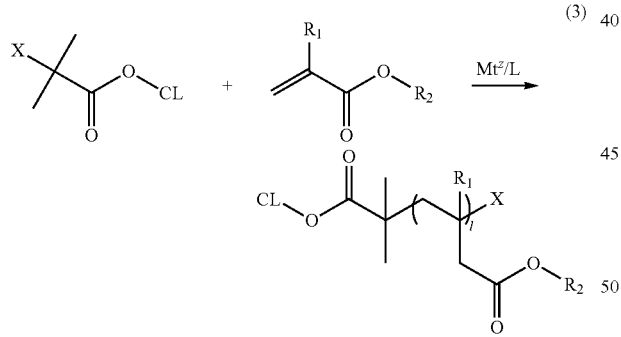

(3)

(wherein $R_1$ represents a hydrogen group or a methyl group; $R_2$ represents a functional group that imparts hydrophilicity to the molecule; l represents an integer of 1 or more; X represents a chlorine group or a bromine group; Mt represents a metal ion; L represents a ligand; Z represents an integer of 1 to 3; and CL represents an unhydrated ophthalmic lens substrate).

In another specific embodiment of one embodiment of the production method of the present invention, when it is desired to form random copolymers as the graft polymers to be formed on the surface of an ophthalmic lens, an unhydrated ophthalmic lens having an alkyl halide group is immersed once in an ATRP reaction mixture containing two or more hydrophilic monomers. This causes a polymerization reaction as shown in the following general formula (4) to proceed to give an unhydrated ophthalmic lens having on its lens surface a hydrophilic random copolymer which is halogenated at the terminal:

(Chemical formula 5)

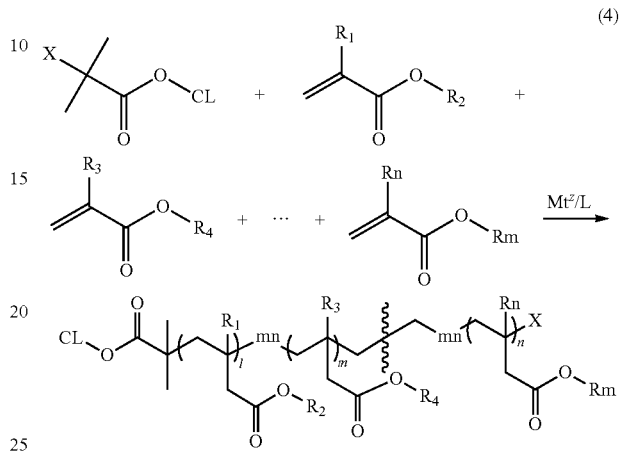

(4)

(wherein $R_1$, $R_3$, and $R_n$ each independently represent a hydrogen group or a methyl group; $R_2$, $R_4$, and $R_m$ each independently represent a functional group that imparts hydrophilicity to the molecule; l, m, and n each independently represent an integer of 1 or more; X represents a chlorine group or a bromine group; Mt represents a metal ion; L represents a ligand; Z represents an integer of 1 to 3; and CL represents a unhydrated ophthalmic lens substrate).

In another specific embodiment of one embodiment of the production method of the present invention, when it is desired to form block copolymers as the graft polymers to be formed on the surface of an ophthalmic lens, an unhydrated ophthalmic lens having an alkyl halide group is immersed sequentially in an ATRP reaction mixture containing a first hydrophilic monomer and in an ATRP reaction mixture containing a second hydrophilic monomer different from the first hydrophilic monomer. This causes a polymerization reaction as shown in the following general formula (5) to proceed to give an unhydrated ophthalmic lens having on its lens surface a hydrophilic block copolymer which is halogenated at the terminal:

(Chemical formula 6)

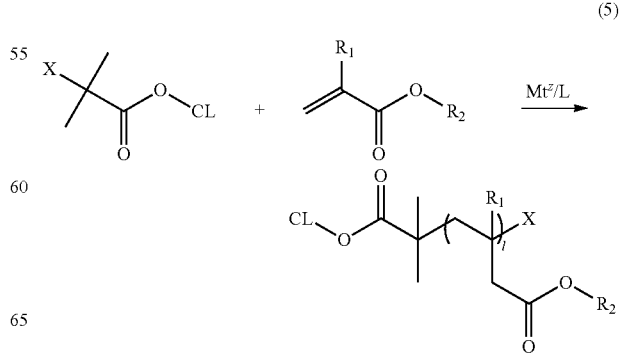

(5)

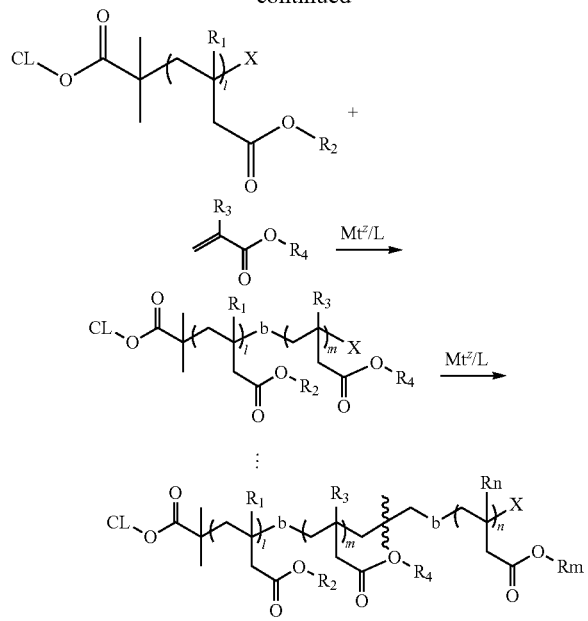

(wherein $R_1$, $R_3$, and $R_n$ each independently represent a hydrogen group or a methyl group; $R_2$, $R_4$, and $R_m$ each independently represent a functional group that imparts hydrophilicity to the molecule; l, m, and n each independently represent an integer of 1 or more; X represents a chlorine group or a bromine group; Mt represents a metal ion; L represents a ligand; Z each independently represent an integer of 1 to 3; and CL represents a unhydrated ophthalmic lens substrate). As there is no limit to the number of times of the polymerization reaction, block copolymers comprising a corresponding number of blocks can be formed by preparing a predetermined number of ATRP reaction mixtures and sequentially immersing the unhydrated ophthalmic lens having alkyl halide groups in the respective ATRP reaction mixtures.

In another specific embodiment of one embodiment of the production method of the present invention, when it is desired to form structures consisting of multiple different block copolymers and/or random copolymers as the graft polymers to be formed on the surface of an ophthalmic lens, two or more ATRP reaction mixtures containing hydrophilic monomers are prepared depending on the types of the hydrophilic monomers, and an unhydrated ophthalmic lens having an alkyl halide group is immersed sequentially in the respective ATRP reaction mixtures. This causes a polymerization reaction as shown in the following general formula (6) to proceed to give an unhydrated ophthalmic lens having on its lens surface a hydrophilic block copolymer and/or a hydrophilic random copolymer which is halogenated at the terminal:

(Chemical formula 7)

(6)

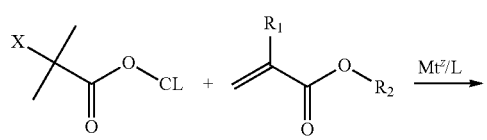

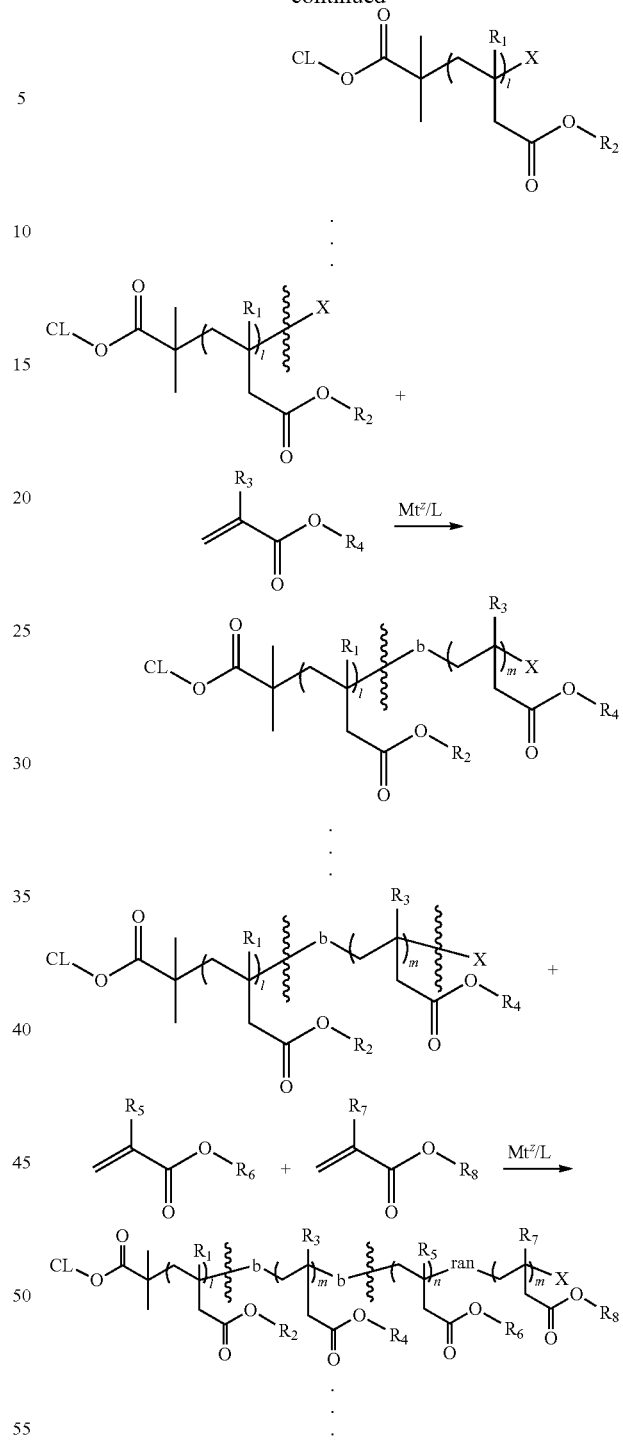

(wherein $R_1$, $R_3$, $R_5$, and $R_n$ each independently represent a hydrogen group or a methyl group; $R_2$, $R_4$, $R_6$, and $R_m$ each independently represent a functional group that imparts hydrophilicity to the molecule; l, m, and n each independently represent an integer of 1 or more; X represents a chlorine group or a bromine group; Mt represents a metal ion; L represents a ligand; Z represents an integer of 1 to 3; and CL represents a unhydrated ophthalmic lens substrate). As there is no limit to the number of times of the polymerization reaction, copolymers comprising a corresponding number of blocks and random units can be formed by preparing a predetermined number of ATRP reaction mixtures and sequentially immersing the unhydrated ophthalmic lens having alkyl halide groups in the respective ATRP reaction mixtures.

The condition for the ATRP reaction (graft polymerization) in one embodiment of the production method of the present invention is not particularly limited as long as an unhydrated ophthalmic lens having on its lens surface a hydrophilic polymer which is halogenated at the terminal is obtained as the product. While the reaction condition may be properly determined based on the types and the amounts of the components involved in the ATRP reaction, such as alkyl halides, hydrophilic monomers, and metal complexes, the reaction can be carried out, for example, under the following condition; that is, under atmospheric pressure at 0 to 30° C., preferably at room temperature, for a reaction time of 10 to 120 min, preferably 10 to 60 min. If the reaction time is less than 10 min, the graft polymerization may occur but the desired wettability may not be imparted to the lens surface of the unhydrated ophthalmic lens. A prolonged reaction time normally does not pose any problem. In some cases, however, excessive graft polymers may form on the lens surface to impart undesirable water-absorption property that can lead to deformation and clouding of the ophthalmic lens.

The end condition for the step in one embodiment of the production method of the present invention is not particularly limited as long as an unhydrated ophthalmic lens having on its lens surface a hydrophilic polymer which is halogenated at the terminal is obtained as the product. To terminate the graft polymerization after formation of the desired hydrophilic graft polymer on the surface of the ophthalmic lens, the unhydrated ophthalmic lens can be placed under a reaction terminating condition that prevents the abstraction by the metal complex of the terminal halogen of the hydrophilic polymer on the lens surface. Such a reaction terminating condition can be achieved, for example, through oxidation and removal of the metal ions. The oxidation of the metal ion can be carried out, for example, by immersing the completed unhydrated ophthalmic lens in an undegassed aqueous solution in which dissolved oxygen is present. The metal ions in the vicinity of the lens surface are oxidized by oxygen present in the aqueous solution and lose their ability to form metal complexes and thus, their catalytic effect. On the other hand, the removal of the metal ions can be carried out, for example, by immersing the completed unhydrated ophthalmic lens in a solution containing a chelating agent such as ethylenediamine tetraacetic acid (EDTA) and washing the lens.

In one embodiment of the production method of the present invention, various other steps or manipulations may be added before, after, or during the above-described step as long as the objectives of the present invention can be achieved.

According to one embodiment of the production method of the present invention, an unhydrated ophthalmic lens with desired water wettability and antifouling property imparted to the lens surface thereof can be obtained. According to one embodiment of the production method of the present invention, an unhydrated ophthalmic lens having a variety of hydrophilic surfaces to suit intended purposes can be produced by introducing block copolymers onto the lens surface, which was difficult by the conventional graft polymerization process.

A second embodiment of the present invention is an unhydrated ophthalmic lens that has on its lens surface a hydrophilic polymer which is halogenated at the terminal and has a contact angle of less than 90°. In one embodiment of the unhydrated ophthalmic lens of the present invention, the hydrophilic polymer on the lens surface may be a hydrophilic homopolymer, a hydrophilic block copolymer, or a hydrophilic random copolymer. One embodiment of the unhydrated ophthalmic lens of the present invention preferably comprises, as the ophthalmic lens substrate, a copolymer of monomer components including an alkyl halide monomer and a hydrophobic monomer, and more preferably comprises a copolymer of monomer components including an alkyl halide monomer, a hydrophobic monomer, and a silicone monomer. One embodiment of the unhydrated ophthalmic lens of the present invention can be used as an ophthalmic lens for direct or indirect use on the eyes, including hard contact lenses, soft contact lenses, and disposable contact lenses.

With regard to the production method of the hydrated ophthalmic lens as one embodiment of the present invention, reference may be made to the description of the production method as one embodiment of the present invention where appropriate. The hydrated ophthalmic lens as one embodiment of the present invention has a contact angle of less than 90° and a favorable wettability and offers high lubricity, antifouling property and resistance against surrounding environments. It further contains a silicone component that provides high oxygen permeability. Because of these characteristics, the hydrated ophthalmic lens can withstand prolonged wearing and is highly useful for the wearer.

The present invention will now be described more specifically with reference to the following Examples, which are not intended to restrict or limit the present invention. The present invention may take various forms to the extent that the objectives of the present invention are achieved.

EXAMPLES

1. Production of Unhydrated Soft Ophthalmic Lens Substrates 1 and 2

Each component was weighed in the amount (g) shown in Table 1. The weighed components were then stirred and mixed for 30 min until uniform to form a mixture. The resulting mixture was poured in a female mold of a polypropylene mold shaped as an ophthalmic lens and the mold was closed with a corresponding male mold. The closed mold was then illuminated by an LED light source with a wavelength of 405 nm at a luminance of 1.00 mW/cm$^2$ for one hour to complete polymerization. The male and female molds were separated and the adhered polymer was released from the molds and immersed in isopropyl alcohol at 60° C. for one hour. The immersion process was repeated twice by replacing the solvent to remove excess material from the polymer. Subsequently, the polymer was left in an oven at 90° C. for one night to remove isopropyl alcohol from within the polymer. This gave unhydrated soft ophthalmic lens substrates 1 and 2.

2. Production of Unhydrated Hard Ophthalmic Lens Substrate 3

Each component was weighed in the amount (g) shown in Table 2. The weighed components were then stirred and mixed for 30 min until uniform to forma mixture. The resulting mixture was poured in a cylindrical polypropylene mold and the opening was sealed. Subsequently, the mold was heated to 90° C. stepwise to complete polymerization.

The resulting bar-shaped polymer was removed from the mold and was cut and ground to obtain an unhydrated hard ophthalmic lens substrate 3.

3. Production of Unhydrated Soft Ophthalmic Lens Substrate 4

An unhydrated soft ophthalmic lens substrate 4 was obtained in the same manner as in ophthalmic lenses 1 and 2, except that the components do not include BIMA as shown in Table 1.

4. Production of Unhydrated Hard Ophthalmic Lens Substrate 5

An unhydrated hard ophthalmic lens substrate 5 was obtained in the same manner as in ophthalmic lens 3, except that the components do not include BIMA as shown in Table 2.

5. Preparation of ATRP Reaction Mixture

Each component was weighed according to Table 3. The weighed components were then stirred for 30 min to obtain a mixture, which was then mixed at room temperature until uniform using a magnetic stirrer. The resulting uniform mixture was bubbled with argon for 15 min to obtain ATRP reaction mixtures A through F, G(1), G(2), H(1), H(2) and I.

TABLE 1

| | | Formulation/g | | |
|---|---|---|---|---|
| Soft lens | | 1 | 2 | 4 |
| Component | FM-7725 | 4.5 | 4.5 | 4.5 |
| | LA | 3.49 | 3.2 | 3.5 |
| | V-3FM | 2 | 2 | 2 |
| | BIMA | 0.01 | 0.3 | 0 |
| Additive | IC-819 | 0.05 | 0.05 | 0.05 |

TABLE 2

| | | Formulation/g | |
|---|---|---|---|
| Hard lens | | 3 | 5 |
| Component | Tris | 40 | 40 |
| | MMA | 52 | 52 |
| | ED | 3 | 3 |
| | MAA | 4.5 | 5 |
| | BIMA | 0.5 | 0 |
| Additive | IC-819 | 0.1 | 0.1 |

Meanings of the abbreviation of each component in Tables 1 and 2 are as follows:
Fm-7725: α, ω-dimethacryloxypropyl poly(dimethylsiloxane)
LA: lauryl acrylate
V-3F: 3,3,3-trifluoroethyl acrylate
BIMA: 2-(2-bromoisobutyryloxy)ethyl methacrylate
IC819: bis(2,4,6-trimethylbenzoyl)-phenylphosphine oxide
Tris: tris trimethylsiloxypropyl methacrylate
MMA: methyl methacrylate
MAA: methacrylic acid
ED: ethylene glycol dimethacrylate

TABLE 3

| | | | | | | | | | G | | H | | |
|---|---|---|---|---|---|---|---|---|---|---|---|---|---|
| | Compound name | A | B | C | D | E | F | (1) | (2) | (1) | (2) | I |
| Monomer | Acrylamide | 0.5 | 0.5 | 0.5 | — | — | — | — | 0.5 | 0.5 | — | 1.0 |
| | Methacrylic acid | — | — | — | 0.5 | — | — | 0.5 | — | — | — | — |
| | 2-dimethylaminomethyl acrylate | — | — | — | — | 0.5 | — | — | — | — | — | — |
| | 2-methacryloyloxyethyl phosphorylcholine | — | — | — | — | — | 0.5 | — | — | — | 0.5 | — |
| | Methylene bis-acrylamide | — | — | — | — | — | 0.05 | — | — | — | 0.05 | 0.1 |
| Metal salt | Copper (II) bromide | 0.01 | 0.005 | 0.001 | 0.01 | 0.01 | 0.05 | 0.01 | 0.01 | 0.01 | 0.01 | 0.003 |
| | Copper (I) bromide | — | — | — | — | — | 0.02 | — | — | — | — | — |
| Reducing agent | Ascorbic acid | 0.4 | 0.2 | 0.04 | 0.4 | 0.4 | — | 0.4 | 0.4 | 0.4 | 0.4 | 0.2 |
| Ligand | N,N,N',N'',N''-pentamethyldiethylenetriamine | 0.3 | 0.15 | 0.03 | — | 0.3 | — | 0.3 | 0.3 | 0.3 | 0.3 | 0.15 |
| | Tris [2-(dimethylamino)ethyl]amine | — | — | — | 0.3 | — | — | — | — | — | — | — |
| | 2,2'-dipyridyl | — | — | — | — | — | 0.3 | — | — | — | — | — |
| Solvent | Water | 10 | 10 | 10 | 10 | 10 | 10 | 10 | 10 | 10 | 10 | 10 |

6. Evaluation of Ophthalmic Lenses

The ophthalmic lenses described below were evaluated according to the following evaluation criteria.

(1) Wettability

The wettability of the ophthalmic lenses was evaluated by water contact angle. The contact angle was measured in the following manner. An ophthalmic lens was placed on a female mold of an ophthalmic lens mold and excess moisture was removed. Drops of 1 mg of pure water were dropped on the apex of the ophthalmic lens and the contact angle was measured. Evaluation criteria were as follows:
A circle indicates a contact angle of less than 90°.
A cross indicates a contact angle of 90° or more.

(2) Lubricity

The lubricity of the resulting ophthalmic lenses was evaluated by touching with a finger. Evaluation criteria were as follows:
A circle indicates a highly lubricious surface.
A triangle indicates a slippery surface.
A cross indicates sense of stickiness and friction.

(3) Antifouling Property

A 0.5 wt % tocopherol solution of Sudan Black B (Aldrich) was prepared and an ophthalmic lens was immersed in the solution for 5 min. After immersion, the ophthalmic lens was rinsed with warm water to remove excess staining solution and was dried. The degree of staining of the ophthalmic lens after drying was visually evaluated. Evaluation criteria were as follows:

A circle indicates that no staining or residual oil was observed.

A triangle indicates that staining was not observed but residual oil was observed.

A cross indicates that staining and residual oil were clearly visible.

(4) Resistance Against Surrounding Environments

An ophthalmic lens was immersed in a 5 wt % aqueous sodium chloride solution and autoclaved at 121° C. at 2 atm. Subsequently, the ophthalmic lens was removed and thoroughly washed with pure water and was evaluated for wettability and lubricity.

(5) Change Over Time by Reaction Time

The effect of difference in immersion time in an ATRP reaction mixture on the hydrophilicity of the ophthalmic lens surface was evaluated from the results of the infrared spectrum and water contact angle measurement.

7. Examples 1-11 and Reference Example 1

The unhydrated soft ophthalmic lens substrates 1 and 2 and the unhydrated hard ophthalmic lens substrate 3 were immersed in each ATRP reaction mixture for 30 min at room temperature according to Table 4. For the ATRP reaction mixtures G and H, the ophthalmic lens substrates were first immersed in G (1) or H (1) at room temperature for 30 min and sequentially washed with a 0.5 wt % EDTA solution and pure water. The ophthalmic lens substrates were then immersed in G (2) or H (2) at room temperature for 30 min. Subsequently, the ophthalmic lens substrates were removed from the ATRP reaction mixture, washed sequentially with a 0.5 wt % aqueous EDTA solution and pure water to obtain unhydrated soft ophthalmic lenses and unhydrated hard ophthalmic lenses of Examples 1-11. For Reference Example 1, unhydrated soft ophthalmic lens substrate 1 was directly used as an ophthalmic lens without immersing in any of the ATRP reaction mixtures. The resulting unhydrated soft ophthalmic lens was transferred to a sealed container with saline and autoclaved at 121° C. for 20 min. Meanwhile, the resulting unhydrated hard ophthalmic lens was subjected to evaluation without autoclaving.

8. Examples 12 to 14

Unhydrated soft ophthalmic lenses of Examples 12-1 to 8, Examples 13-1 to 4, and Examples 14-1 to 2 were obtained in the same manner as in Examples 1 to 11, except that the immersion time was varied. Note that Examples 13-1 to 4 were not immersed in the ATRP reaction mixture G (2) after immersion in the ATRP reaction mixture G (1). Examples 14-1 to 2 were immersed in the ATRP reaction mixture G (1) for 30 min and immersed in the ATRP reaction G (2) for 10 min or 30 min.

9. Comparative Examples 1 to 4

Comparative Example 1

Surface modification of BIMA-free soft ophthalmic lens.
Unhydrated soft ophthalmic lens of Comparative Example 1 was obtained in the same manner as in Example 1, except that unhydrated soft ophthalmic lens substrate 4 was used.

Comparative Example 2

Surface modification of BIMA-free hard ophthalmic lens.
Unhydrated hard ophthalmic lens of Comparative Example 2 was obtained in the same manner as in Example 11, except that unhydrated hard ophthalmic lens substrate 5 was used.

Comparative Example 3

Surface modification of hard ophthalmic lens using radicals generated by plasma irradiation as initiation points.
Unhydrated hard ophthalmic lens substrate 5 was placed in a plasma chamber (volume=45 L, electrode surface area=400 cm$^2$, distance between electrode substrates=15 cm). After the chamber was evacuated to 1.0 Barr, discharge was applied at a power density of 0.15 W/cm$^2$ for 30 min. After the process was complete, unhydrated hard ophthalmic lens substrate 5 was immersed in a 10 mL aqueous solution of 0.5 g acrylamide and 0.01 g ferrous ammonium sulfate. The solution was then allowed to stand for 1 hour at 35° C. Subsequently, unreacted components were removed by distilled water to obtain an unhydrated hard ophthalmic lens of Comparative Example 3 that was modified by graft polymers grown by using radicals generated by plasma irradiation as initiation points.

Comparative Example 4

Surface modification of soft ophthalmic lens using LbL process.
Unhydrated soft ophthalmic lens substrate 4 was sequentially immersed in a 1.0 wt % aqueous solution of polyacrylic acid, a 1.0 wt % aqueous solution of polyallylamine, and a 1.0 wt % aqueous solution of polyacrylic acid. Subsequently, the lens substrate was washed with pure water. In this manner, unhydrated soft ophthalmic lens of Comparative Example 4 coated with polyacrylic acid-polyallylamine-polyacrylic acid was obtained.

TABLE 4

| | | ATRP | Wettability | | | | Surrounding environments | |
|---|---|---|---|---|---|---|---|---|
| | Substrate | reaction mixture | Contact angle (°) | Evaluation | Lubricity | Antifouling property | Wettability | Lubricity |
| Reference Example 1 | 1 | — | 108 | X | X | — | — | — |
| Example 1 | 1 | A | 69 | ○ | ○ | ○ | — | — |
| Example 2 | 1 | B | 41 | ○ | ○ | ○ | 43 | ○ |
| Example 3 | 1 | C | 47 | ○ | ○ | ○ | — | — |
| Example 4 | 1 | D | 78 | ○ | ○ | ○ | 81 | ○ |

TABLE 4-continued

|  | Substrate | ATRP reaction mixture | Wettability Contact angle (°) | Evaluation | Lubricity | Antifouling property | Surrounding environments Wettability | Lubricity |
|---|---|---|---|---|---|---|---|---|
| Example 5 | 1 | E | 101 | Δ | ○ | ○ | — | — |
| Example 6 | 1 | F | 85 | ○ | ○ | ○ | — | — |
| Example 7 | 1 | G(1)→G(2) | 30 | ○ | ○ | ○ | — | — |
| Example 8 | 1 | H(1)→H(2) | 62 | ○ | ○ | ○ | 61 | ○ |
| Example 9 | 2 | A | 46 | ○ | ○ | ○ | — | ○ |
| Example 10 | 3 | A | 51 | ○ | ○ | ○ | — | ○ |
| Example 11 | 1 | I | 28 | ○ | ○ | ○ | — | — |
| Comparative Example 1 | 4 | A | 108 | X | X | X | — | — |
| Comparative Example 2 | 5 | A | 102 | X | X | X | — | — |
| Comparative Example 3 | 5 | — | — | — | ○ | X | — | — |
| Comparative Example 4 | 4 | — | 65 | ○ | ○ | ○ | 103 | X |

TABLE 5

|  | Substrate | ATRP reaction mixture | Immersion time (min) | Contact angle (°) |
|---|---|---|---|---|
| Example 12-1 | 1 | B | 5 | 92 |
| Example 12-2 | 1 | B | 10 | 74 |
| Example 12-3 | 1 | B | 15 | 67 |
| Example 12-4 | 1 | B | 20 | 58 |
| Example 12-5 | 1 | B | 30 | 36 |
| Example 12-6 | 1 | B | 45 | 38 |
| Example 12-7 | 1 | B | 60 | 44 |
| Example 12-8 | 1 | B | 90 | 44 |
| Example 13-1 | 1 | G(1) | 10 | 78 |
| Example 13-2 | 1 | G(1) | 20 | 78 |
| Example 13-3 | 1 | G(1) | 30 | 85 |
| Example 13-4 | 1 | G(1) | 45 | 75 |
| Example 14-1 | 1 | G(1)→G(2) | 30→10 | 68 |
| Example 14-2 | 1 | G(1)→G(2) | 30→30 | 28 |

10. Evaluation Results of Ophthalmic Lenses (1)

The ophthalmic lenses of Reference Example 1, Examples 1 to 11, and Comparative Examples 1 to 4 were evaluated for the effect of surface modification according to the evaluation of ophthalmic lenses (1) to (4) described in 6 above. The results are shown in Table 4.

As shown in Table 4, the surfaces of the ophthalmic lenses of Examples 1 to 11, each produced from a lens substrate made of a polymer obtained by polymerizing monomer components including a polymerizable alkyl halide agent, had an introduced graft polymer formed from a hydrophilic monomer contained in an ATRP reaction mixture in which they were immersed and exhibited superior wettability, lubricity and antifouling property as compared to the surfaces of the lens substrates used.

In contrast, the ophthalmic lenses of Comparative Examples 1 and 2 did not show any effect of the surface modification. Although the ophthalmic lens of Comparative Example 3 showed lubricity, residual oil was observed in the antifouling property test, indicating low antifouling property. The ophthalmic lens of Comparative Example 4 showed poor wettability and low lubricity in the test for resistance to surrounding environments, indicating poor resistance against changes in the surrounding environments.

11. Evaluation Results of Ophthalmic Lenses (2)

The ophthalmic lenses of Examples 12 to 14 and Comparative Example 1 were evaluated for the hydrophilicity of the lens surface according to the evaluation of ophthalmic lenses (5) described in 6 above. The measurement results of infrared spectrum and water contact angle are shown in FIGS. 1 to 5 and in Table 5.

As shown in FIGS. 1-3, with the increase in the immersion time, the peaks resulting from graft polymers increased in the infrared spectrometry and the contact angle decreased in the water contact angle test. When G(1) and G(2) were selected as the ATRP reaction mixture, the peak resulting from methacrylic acid increased over time for G(1) as shown in FIGS. 2A and 2B, whereas the peak resulting from acrylamide increased for G(2) as shown in FIG. 3. This suggests that the graft polymer has grown from the termination ends of the polymethacrylic acid, the first polymer, and thus, the graft polymer is a block copolymer. As shown in FIG. 4 and Table 5, when the lens substrates are immersed in the ATRP reaction mixtures for more than 10 minutes, the contact angle becomes less than 90°, indicating that the surface of the ophthalmic lenses have been made hydrophilic.

In contrast, as shown by the results of infrared spectrometry in FIG. 5, elongation of graft polymer was not observed in the ophthalmic lens of Comparative Example 1. Similarly, elongation of graft polymer was not observed in the ophthalmic lens of Comparative Example 2, either, as shown by the results of infrared spectrometry.

As demonstrated by the evaluation results above, the ophthalmic lenses of Examples, which are made by using a lens substrate made of a polymer obtained by polymerizing monomer components including a polymerizable alkyl halide agent and which are treated with an ATRP reaction mixture to grow a graft polymer formed from a hydrophilic monomer on the lens surface, have superior wettability, lubricity and antifouling property as compared to the ophthalmic lenses that do not have graft polymers on the lens surface or the ophthalmic lenses that have their lens surfaces modified by other methods. Further, the results of the infrared absorption analysis demonstrate that ophthalmic lenses having graft polymers on the lens surface have actually been manufactured.

INDUSTRIAL APPLICABILITY

According to the present invention, there is provided a method for producing an unhydrated ophthalmic lens that has on its lens surface a hydrophilic polymer having a terminal alkyl halide, the unhydrated ophthalmic lens stably achieving desired hydrophilicity of the lens surface. In addition, the ophthalmic lens obtained by the production method has decreased lipophilicity and water repellency on the lens surface despite its oxygen permeability, such that it can be worn by ophthalmic lens wearers for an extended period, thus contributing to the health and welfare of mankind.

The invention claimed is:

1. A method of producing an unhydrated ophthalmic lens having on its lens surface a hydrophilic polymer which is halogenated at the terminal, comprising the step of
bringing an unhydrated ophthalmic lens having an alkyl halide group into contact with an aqueous solution containing a hydrophilic monomer and a metal complex to obtain the unhydrated ophthalmic lens having on its lens surface a hydrophilic polymer which is halogenated at the terminal;
wherein the unhydrated ophthalmic lens having an alkyl halide group is an unhydrated ophthalmic lens comprising a copolymer of 2-(2-bromoisobutyryloxy)ethyl (meth)acrylate and a hydrophobic monomer.

2. The method according to claim 1, wherein the hydrophilic polymer is a hydrophilic homopolymer, a hydrophilic block copolymer or a hydrophilic random copolymer.

3. The method according to claim 1, wherein the metal complex is a metal complex comprising a copper ion and a ligand.

4. The method according to claim 1, wherein the aqueous solution further contains a reducing agent.

5. The method according to claim 1, wherein the aqueous solution further contains at least one reducing agent selected from the group consisting of di(ethylhexane)tin, L-ascorbic acid, sodium L-ascorbate, glucose, and hydrazine.

6. An unhydrated ophthalmic lens which has on its lens surface a hydrophilic polymer which is halogenated at the terminal and has a contact angle of less than 90°;
wherein the unhydrated ophthalmic lens comprises a copolymer of 2-(2-bromoisobutyryloxy)ethyl (meth)acrylate and a hydrophobic monomer.

7. The unhydrated ophthalmic lens according to claim 6, wherein the hydrophilic polymer is a hydrophilic homopolymer, a hydrophilic block copolymer or a hydrophilic random copolymer.

8. The method according to claim 1, wherein the unhydrated ophthalmic lens comprises a copolymer of 2-(2-bromoisobutyryloxy)ethyl (meth)acrylate, a hydrophobic monomer, and a silicone monomer.

9. The method according to claim 1, wherein the unhydrated ophthalmic lens comprises a copolymer of 2-(2-bromoisobutyryloxy)ethyl (meth)acrylate, a hydrophobic monomer, a silicone monomer, and a hydrophilic monomer.

10. The unhydrated ophthalmic lens according to claim 6, wherein the unhydrated ophthalmic lens comprises a copolymer of 2-(2-bromoisobutyryloxy)ethyl (meth)acrylate, a hydrophobic monomer, and a silicone monomer.

11. The unhydrated ophthalmic lens according to claim 6, wherein the unhydrated ophthalmic lens comprises a copolymer of 2-(2-bromoisobutyryloxy)ethyl (meth)acrylate, a hydrophobic monomer, a silicone monomer, and a hydrophilic monomer.

* * * * *